US007762713B2

(12) United States Patent
Koh

(10) Patent No.: US 7,762,713 B2
(45) Date of Patent: Jul. 27, 2010

(54) FOOD WASTE DISPOSAL SYSTEM

(76) Inventor: Chun Il Koh, 140-64 Sangye-dong, Nowon-gu, Seoul (KR) 139-200

( * ) Notice: Subject to any disclaimer, the term of this patent is extended or adjusted under 35 U.S.C. 154(b) by 88 days.

(21) Appl. No.: 11/773,828

(22) Filed: Jul. 5, 2007

(65) Prior Publication Data
US 2008/0259719 A1 Oct. 23, 2008

(30) Foreign Application Priority Data
Apr. 20, 2007 (KR) ...................... 10-2007-0039044

(51) Int. Cl.
B01F 7/04 (2006.01)
B65F 7/00 (2006.01)
(52) U.S. Cl. ................. 366/138; 220/908.2; 366/168.1; 366/172.1; 435/290.2; 71/901
(58) Field of Classification Search ...................... 71/14, 71/901; 220/908.2; 366/138, 168.1, 172.1, 366/172.2; 435/290.2
See application file for complete search history.

(56) References Cited

U.S. PATENT DOCUMENTS

| 125,074 | A | * | 3/1872 | Parish ......................... 504/102 |
| 425,603 | A | * | 4/1890 | Fleishman ..................... 71/14 |
| 501,037 | A | * | 7/1893 | Arnold ......................... 71/14 |
| 2,391,034 | A | * | 12/1945 | O'Brien ......................... 4/629 |
| 2,637,855 | A | * | 5/1953 | Stafford ................. 241/46.013 |
| 2,938,674 | A | * | 5/1960 | Lee .............................. 241/32 |
| 4,050,899 | A | * | 9/1977 | Grube et al. ................. 422/189 |
| 5,118,005 | A | * | 6/1992 | Onodera ...................... 220/501 |
| 5,577,673 | A | * | 11/1996 | McMurphy et al. ........... 241/33 |
| 5,580,170 | A | * | 12/1996 | Holley et al. ............. 366/325.1 |
| 5,587,320 | A | * | 12/1996 | Shindo et al. ............ 435/290.1 |
| 5,710,042 | A | * | 1/1998 | Shindo et al. ............ 435/290.1 |

(Continued)

FOREIGN PATENT DOCUMENTS

JP          10174959 A    *   6/1998

(Continued)

OTHER PUBLICATIONS

KIPO search report for priority document KR 10-2007-0039044, Dec. 24, 2007, machine translation by KIPO.*

Primary Examiner—David L Sorkin
Assistant Examiner—Andrew Janca
(74) Attorney, Agent, or Firm—John K. Park; Park Law Firm

(57) ABSTRACT

The present invention provides a food waste disposal system including a housing with a food waste introduction opening and a door receiving depression, the door for covering the food waste introduction opening, a prefabricated mixing basin disposed inside the housing and composed of a box-shaped upper body, a hemispherical lower body, and a rotational shaft axially installed on a horizontal central line of the prefabricated mixing basin, a plurality of prefabricated mixing wings engaged with the rotational shaft for cutting food waste into small pieces and agitating the food waste in the prefabricated mixing basin, a geared driving motor for driving the rotational shaft, in which a touch screen panel installed on an upper surface of the housing and a personal computer incorporate PLC Ethernet cards respectively therein so as to allow the food waste disposal system to be controlled from a distance using the computer, which is networked.

20 Claims, 23 Drawing Sheets

U.S. PATENT DOCUMENTS

| | | | |
|---|---|---|---|
| 5,856,173 A * | 1/1999 | Riley et al. | 435/264 |
| 5,925,321 A * | 7/1999 | Koyamoto et al. | 422/122 |
| 5,981,269 A * | 11/1999 | Park | 435/290.2 |
| 6,029,918 A * | 2/2000 | Sundberg | 241/79.3 |
| 6,110,727 A * | 8/2000 | Widmer et al. | 435/262 |
| 6,679,443 B2 * | 1/2004 | Sugiyama et al. | 241/57 |
| 7,520,457 B1 * | 4/2009 | Poitras et al. | 241/101.2 |
| 7,604,986 B2 * | 10/2009 | Koh | 435/290.2 |
| 2002/0022260 A1 * | 2/2002 | Ishii | 435/286.1 |
| 2003/0036190 A1 * | 2/2003 | Hung | 435/290.2 |
| 2004/0199401 A1 * | 10/2004 | Wagner et al. | 705/1 |
| 2005/0155918 A1 * | 7/2005 | Koh | 210/151 |
| 2007/0144951 A1 * | 6/2007 | Kono et al. | 210/97 |
| 2008/0210790 A1 * | 9/2008 | Koh | 241/33 |

FOREIGN PATENT DOCUMENTS

| | | |
|---|---|---|
| JP | 2006061883 A * | 3/2006 |
| KR | 10-0198404 B1 * | 2/1999 |
| KR | 20-0232293 Y1 * | 5/2001 |
| KR | 10-0313314 B1 * | 10/2001 |
| KR | 20-0359746 Y1 * | 8/2004 |
| KR | 10-0656572 B1 * | 12/2006 |

\* cited by examiner

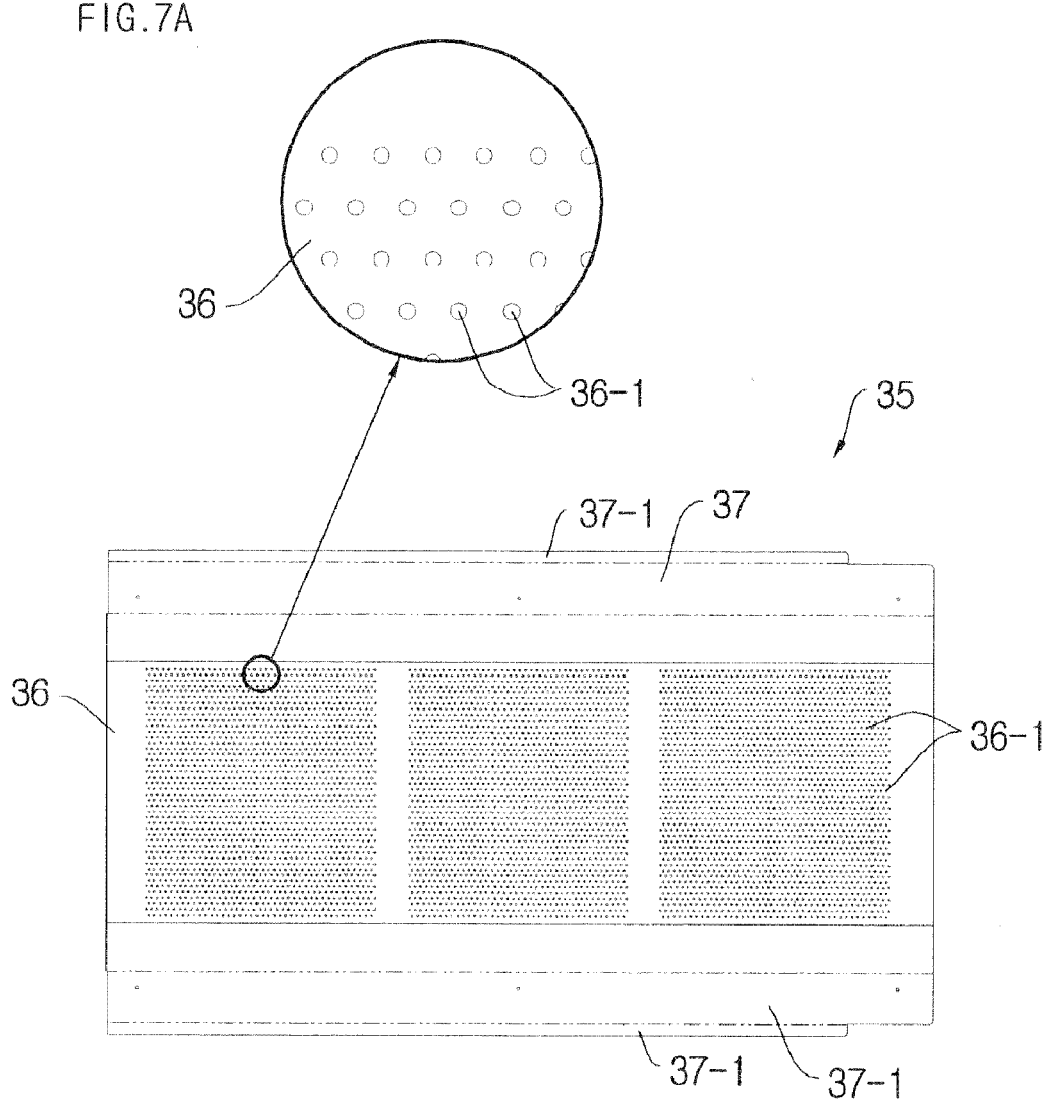

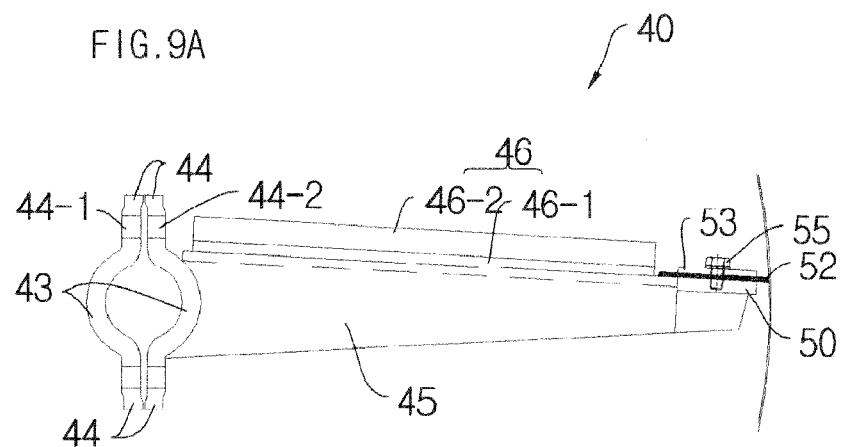

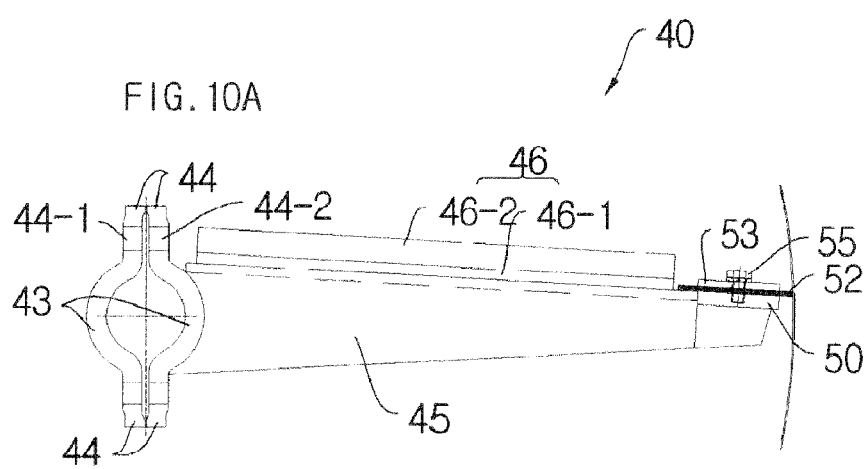

FOOD WASTE DISPOSAL SYSTEM

BACKGROUND OF THE INVENTION

1. Field of the Invention

The present invention relates to a food waste disposal system, which decomposes and terminates organic matter contained in food waste by inputting microbes into the food waste during a process of dehydrating the food waste.

2. Description of the Related Art

Generally, organic waste, such as food waste, contains a large amount of fibrous vegetable and animal material, protein, carbohydrates and calcium. Accordingly, if the organic waste is disposed of as it is in a landfill, without being decomposed, leachate generated from the organic waste permeates into the soil, resulting in the contamination of ground water.

Conventional food waste disposal technologies using microbes are disclosed in Korean Utility Model Publication Nos. 20-1995-5245, 20-1995-7541, 20-1995-7395, Korean Patent Laid-Open Publication Nos. 10-1996-4300, and Korean Utility Model Laid-Open Publication Nos. 20-1994-24804. These technologies are related to methods and apparatuses of fertilizing and composting food waste or organic waste.

The conventional methods and apparatuses can reduce some of the organic matter in food waste or organic waste, but are insufficient with respect to disposal efficiency and capacity because they take a long period to decompose organic matter and they cannot completely decompose organic matter. As a result, odors are generated due to the hazardous gas generated upon the incomplete decomposition of food waste.

Korean Utility Model No. 20-270982 discloses "Apparatus for Decomposing Organic Waste", Korean Patent Laid-Open Publication No. 10-2006-19663 discloses "Apparatus for Treating Food Waste", and Korean Patent No. 10-535699 discloses "Structure of Mixing Basin of Apparatus for Treating Food Waste".

Korean Utility Model Registration No. 20-270982 discloses "Apparatus for Decomposing Organic Waste", which comprises a rotational shaft having a plurality of arm blades, installed along a central horizontal line of a cell casing provided in a housing, a rotation device which includes a gear motor, a driving sprocket, a linking sprocket, and a chain, for rotating the rotational shaft, a hot water tank, and a sprayer with a plurality of spray nozzles, which is installed in an upper part of the cell casing for spraying hot water from the hot water tank into the cell casing, in which the inner temperature of the cell casing can be adjusted by selectively supplying the hot water from the hot water tank, which is provided with a pre-heater.

Korean Patent Laid-Open Publication No. 10-2006-19663 discloses "Apparatus for Treating Food Waste", in which food waste introduced through an entrance formed in an upper portion of a treatment basin is pulverized when it passes through a pulverizing mill and falls down, the pulverized food waste is mixed by mixing blades and decomposed, and then the decomposed food waste is discharged, in which the treatment basin is cleaned by spraying water using a sprayer installed in an upper portion of the treatment basin.

Korean Patent No. 10-535699 discloses "Structure of Mixing Basin of Apparatus for Treating Food Waste" which comprises an outer casing having mixing blades therein, an upper plate which has a drain with a screen thereon and is fixed to the lower end portion of the outer casing, and a lower plate having a drain in the center portion thereof, which is provided under the upper plate and is integrated with the upper plate, in which food waste introduced through an entrance of the outer casing and onto the upper plate is mixed by the mixing blades, and leachate from the food waste is drained through the screen, flows down to the lower plate, and is then discharged through the drain provided to the lower plate.

The above-described food waste disposal apparatuses are operated using manual switches in an analog manner. Accordingly, they have problems in that the manipulation thereof is inconvenient and in that they cannot be selectively operated in either an automatic manner or a manual manner. Further, since hot water cannot be supplied into the cell casing (mixing basin), the food waste treatment capacity and efficiency thereof are low, and it is difficult to clean the inside of the cell casing, and thus odors linger around the apparatus.

Further, since a cleansing device for cleansing the lower plate, on which leachate collects, is not provided, odors occur. Still further, since the cell casing (mixing basin) does not have a leachate discharge device, leachate overflowing from the cell casing cannot be easily discharged, so that the apparatus cannot be smoothly operated.

Still further, the known food waste disposal (mixing) apparatuses cannot be controlled by an operator using a networked computer from a distance. Yet further, it is difficult to repair the food waste disposal apparatus when the apparatus is out of order because a mixing basin and a housing are integrated into a single body by a welding method. Yet further, the food waste disposal apparatuses do not have a good appearance because a door protrudes from the upper surface of the housing.

The known apparatuses are not provided with a spray device which sprays deodorizing agent and decomposing agent and which is installed inside a housing near the food waste introduction opening. Accordingly, when the door is open, the odor of food waste escapes from the housing. Moreover, it is difficult to construct and repair mixing blades because the mixing blades are integrated with the rotational shaft into a single body. The mixing blade is not disposed on the upper portion of a support bar. Accordingly, a great load of food waste is applied to the mixing blades when the mixing blades rotate. As a result, the driving motor cannot conduct reverse rotation. That is, the mixing blades can only continuously conduct forward rotation even in a state in which food waste is stuck to the support bar or the mixing blades. As a result, damage is caused to the driving motor due to the great resistance of the food waste.

The known apparatus is cleansed by cold water supplied from a cold water tank installed outside the mixing basin. Accordingly, it is difficult to separate and remove food waste attached to the inner surface of the mixing basin. Yet further, it is impossible to cleanse and sterilize the inside of the washing room, in which a chamber is disposed, because it is impossible to spray washing water and chemicals into the washing room. Yet further, since the housing is not equipped with a hand cleansing and sterilizing device, it is impossible for a user to wash his or her hands after loading food waste into the food waste disposal apparatus.

SUMMARY OF THE INVENTION

Therefore, the present invention has been made in view of the above problems and an object of the present invention is to provide an improved food waste disposal system.

According to one aspect of the invention, there is provided an improved food waste disposal system including a cell body (mixing basin) with a food waste introduction opening and a door-receiving depression provided on an upper portion thereof around the food waste introduction opening for receiving a door therein, so that the door does not protrude from the upper surface of the upper portion of the cell body, the door for covering the food waste introduction opening, a rotational shaft axially installed along a horizontal central line of the cell body, engaged with a plurality of mixing wings and driven by a driving device having a geared driving motor, PLC Ethernet cards installed in a touch screen control panel installed on the upper surface of the housing and a computer, respectively, the prefabricated mixing basin composed of a plurality of parts, a drag material spray nozzle installed inside the housing around the food waste introduction opening for spraying deodorizing agent and food waste decomposing agent into the cell body, the mixing wings fabricated by assembling a plurality of parts and engaged with the rotational shaft, in which the mixing wing conducts reverse rotation when food waste is stuck to a supporting bar, a built-in hot water tank installed inside the mixing basin for cleansing the inside of the mixing basin by spraying hot water into the mixing basin, a washing water spray nozzle and a chemical spray nozzle installed in a washing room, in which a chamber is disposed, in order to spray washing water and chemicals, and a hand cleansing device installed on a front side of the housing.

In the food waste disposal system, the PLC Ethernet cards installed in the computer and the touch screen control panel, respectively, allow a user to control the food waste disposal system from a distance using a networked computer. Thanks to the structure in which the prefabricated mixing basin is constructed by combining a plurality of parts, the mixing basin can be easily fabricated and repaired. The door is received in the door-receiving depression formed in the upper portion of the housing around the food waste introduction opening when the door is closed, so that the door does not protrude from the upper surface of the housing, and thus the food waste disposal system has a good appearance. The drag material spray nozzle installed inside the housing around the food waste introduction opening sprays deodorizing agent and decomposing agent so as to prevent odors from escaping out of the housing when the door is opened and so as to promote the decomposition of food waste. The mixing wing is composed of a plurality of parts, and thus it is easy to assemble and repair the mixing wing. The parts are provided to the upper portion of the support bar supporting the mixing wing, so that the prefabricated mixing wings cut food waste into small pieces by forward rotation and separate the food waste from the support bar by reverse rotation when the food waste is stuck to the support bar. The built-in hot water tank installed inside the mixing basin easily separates and removes residue of food waste attached to the inner surface of the mixing basin through an operation of spraying hot water. The washing nozzle and chemical nozzle installed in the washing room, in which the chamber is installed, allow cleaning and sterilizing the inside of the washing room. Further, a user can wash and sterilize his or her hands after loading food waste into the cell body through the food waste introduction opening thanks to the hand cleansing and sterilizing device installed on the front side of the housing.

In order to achieve the above-mentioned object, the invention provides a food waste disposal system including a housing with a food waste introduction opening, a door with a handle thereon for covering the food waste introduction opening, in which the door is coupled to an upper surface of the housing in a hinged manner, a mixing basin installed inside the housing, a rotational shaft engaged with a plurality of mixing wings and axially installed on the central horizontal line of the mixing basin, and a driving device having a gear motor for driving the rotational shaft, in which PLC Ethernet cards and are incorporated in a touch screen control panel installed on the upper surface of the housing and a personal computer, respectively, in order to allow a user to control the food waste disposal system from a distance using the computer which is networked, the mixing basin installed inside the housing is constructed by assembling a plurality of fabricated parts so that the mixing basin can be easily constructed and repaired, a door-receiving depression is formed in the inclined upper face of the housing around the food waste introduction opening to received the door therein so that the door does not protrude from the upper surface of the housing, a deodorizing and decomposing agent spray device including a drag material spray nozzle installed inside the housing around the food waste introduction opening and a drag material tank is installed in order to spray a deodorizing and decomposing agent loaded in the drag material tank, each of the mixing wings installed at regular intervals on the rotational shaft in a longitudinal direction is constructed by assembling a plurality of fabricated parts, a built-in hot water spray device including a built-in hot water tank with a heater therein is installed in the mixing basin in order to spray hot water, a geared driving motor is connected to an inverter in order to rotate the rotational shaft in a reverse direction for a predetermined period when an excessive load is applied to the mixing wings, and a hand cleansing and sterilizing device is installed on the front side of the housing in order to allow a user to wash and sterilize his or her hands after loading food waste into the food waste disposal system.

BRIEF DESCRIPTION OF THE DRAWINGS

The above and other objects, features and other advantages of the present invention will be more clearly understood from the following detailed description when taken in conjunction with the accompanying drawings, in which:

FIGS. 7A to 7B are schematic views illustrating the structure of a chamber of the food waste disposal system according to the embodiment;

FIGS. 9A to 9D and 10A to 10D are schematic views illustrating the structure of prefabricated mixing wings installed in the prefabricated mixing basin of the food waste disposal system according to the embodiment.

DETAILED DESCRIPTION OF THE INVENTION

Figure 1:
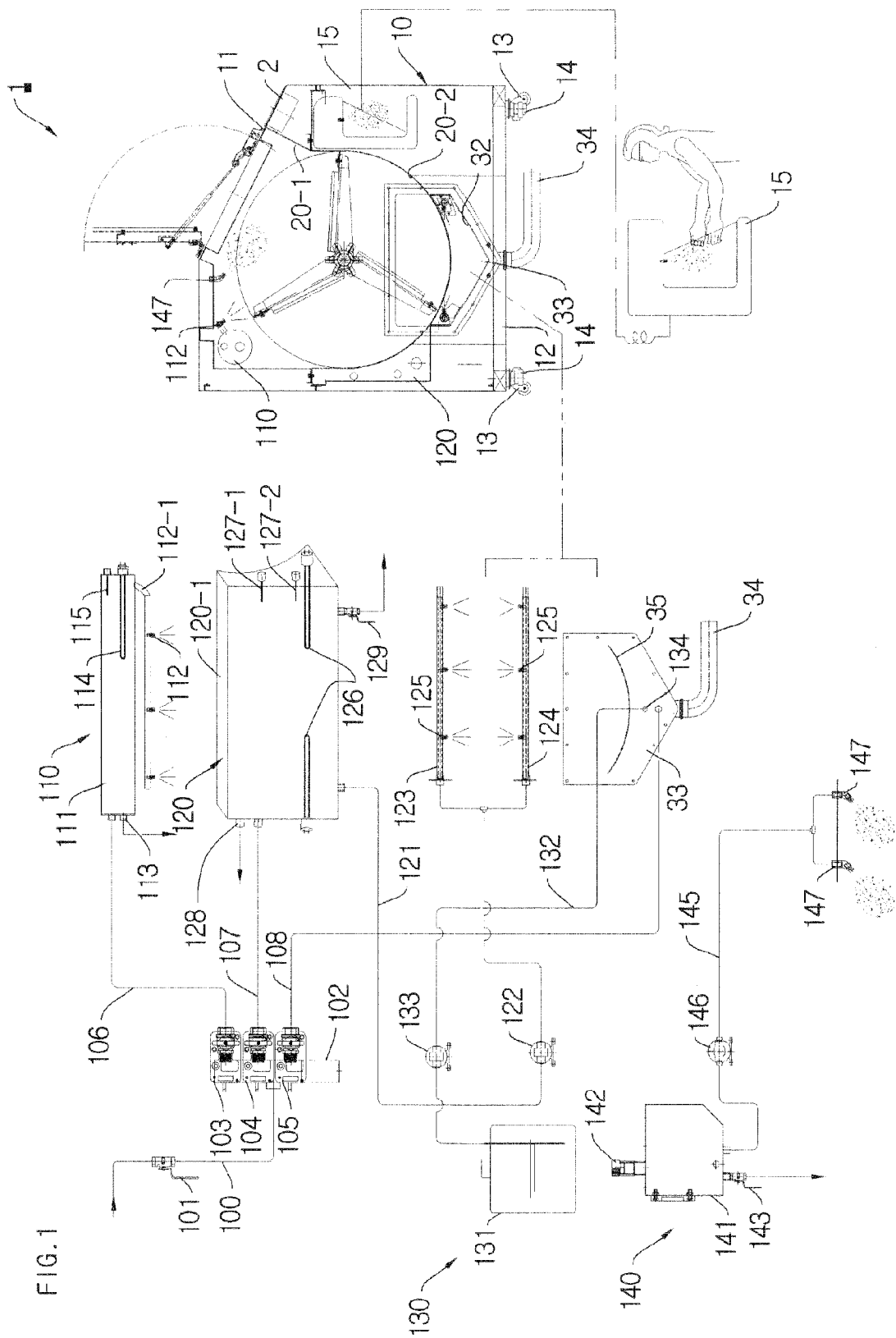
FIG. 1 is a schematic view illustrating a food waste disposal system according to one embodiment of the invention.
Figure 2:
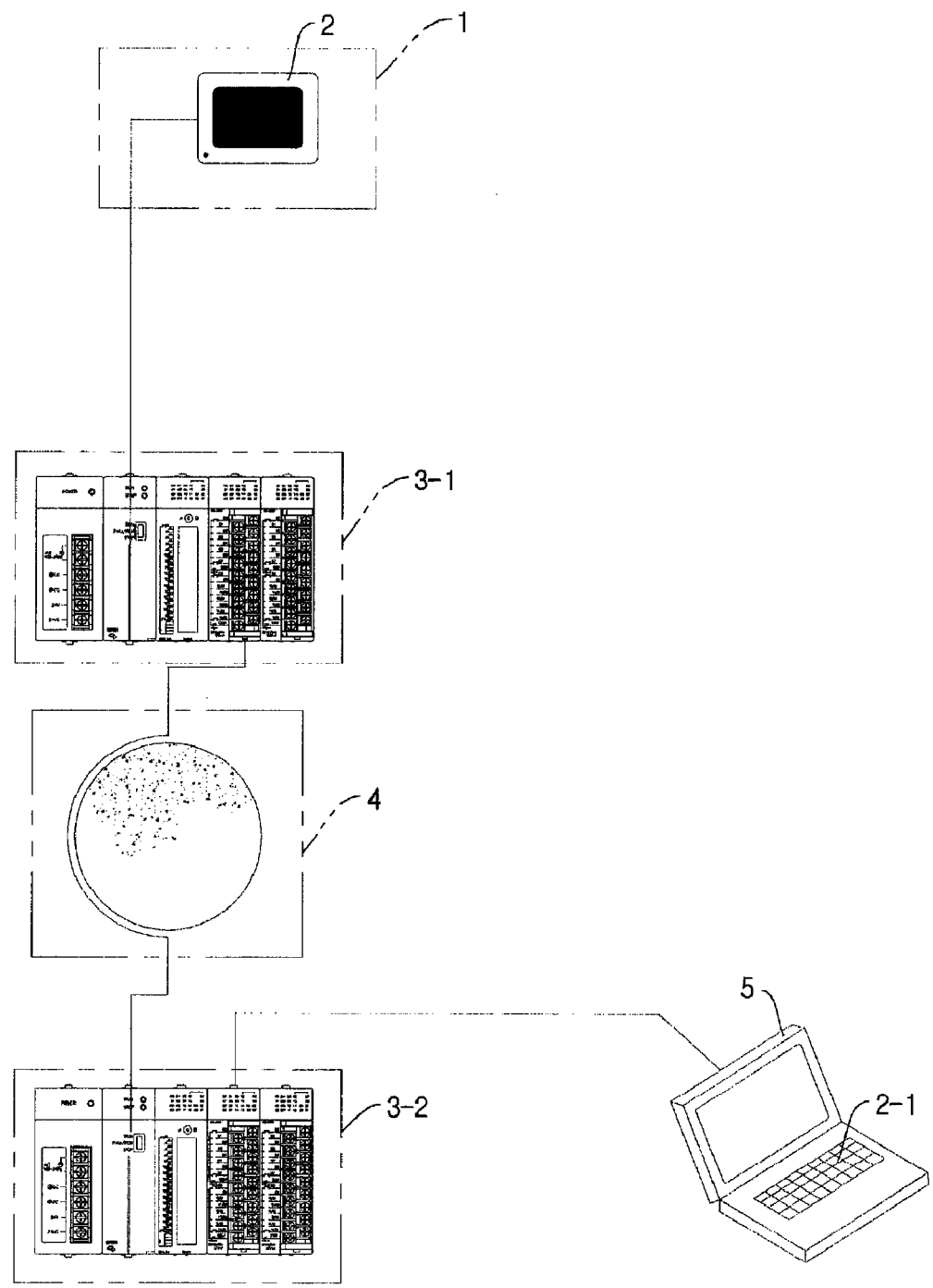
FIG. 2 is a flow diagram illustrating an operation flow of the food waste disposal system according to the embodiment.
Figure 3A:
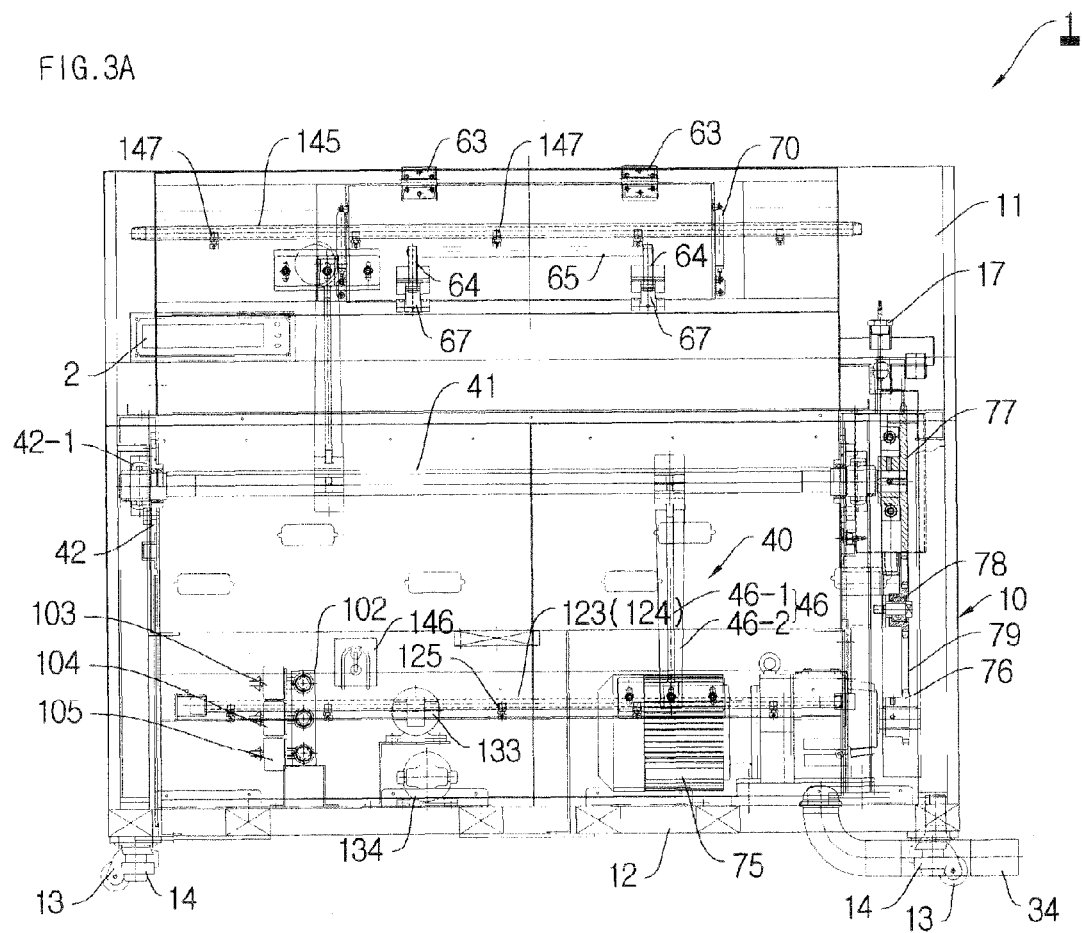
FIGS. 3A to 3C are front plan views illustrating the structure of the food waste disposal system according to the embodiment.
Figure 3B:
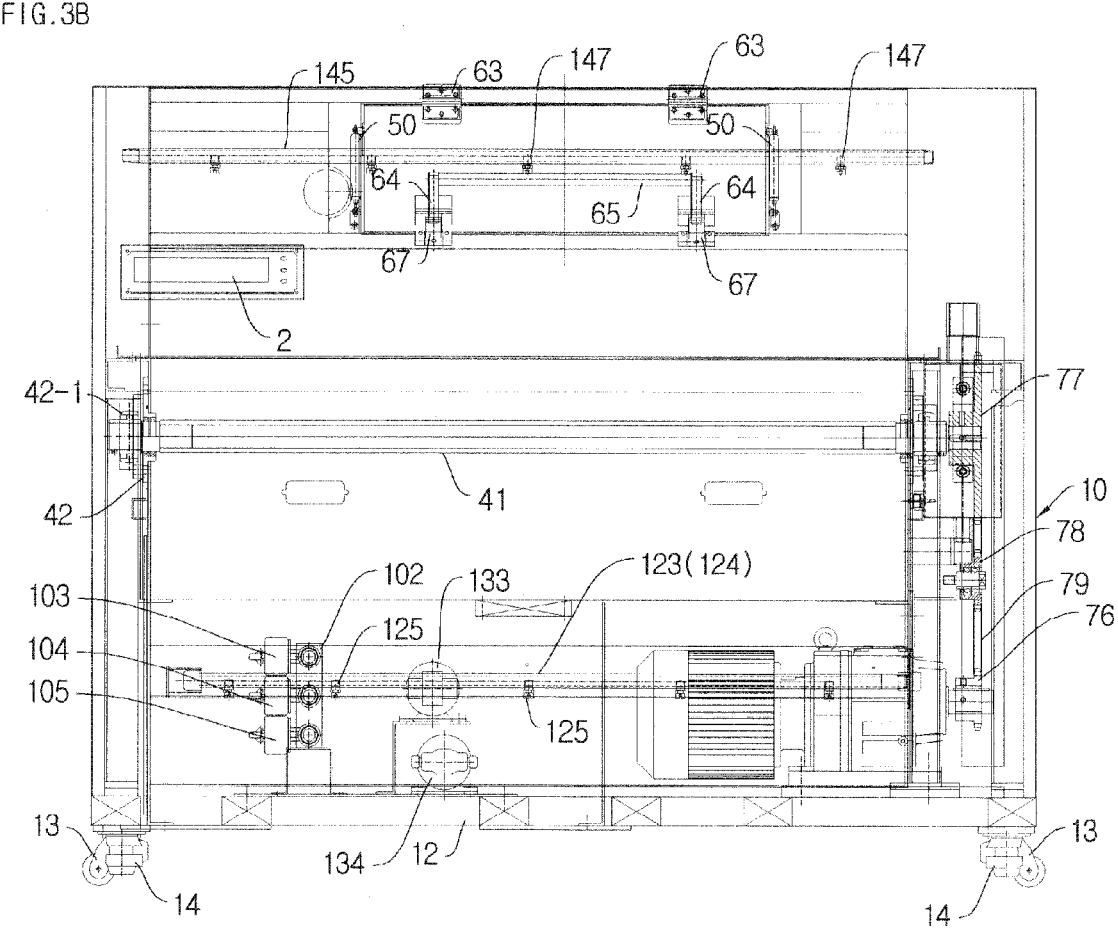
Figure 3C:
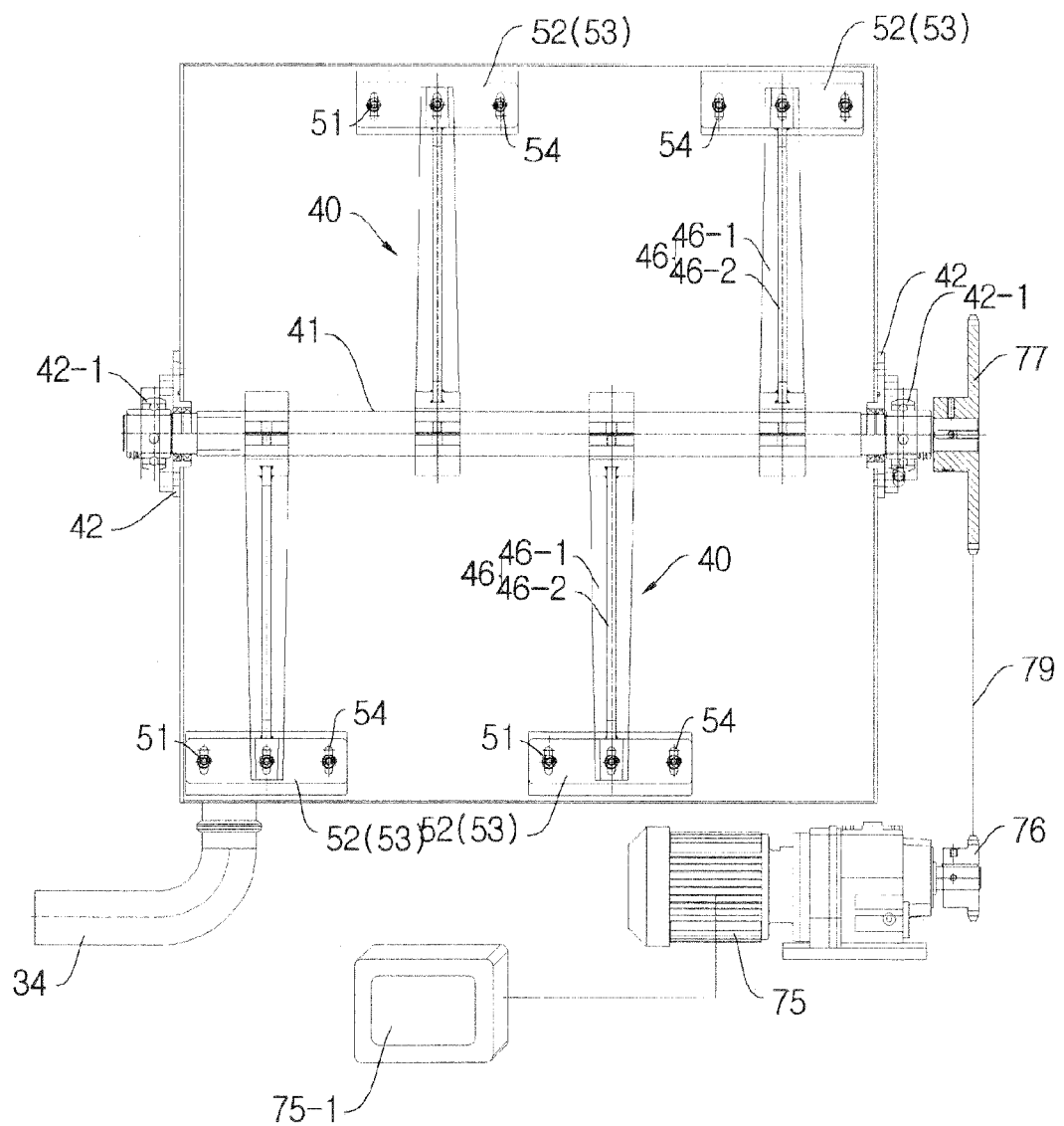
Figure 4A:
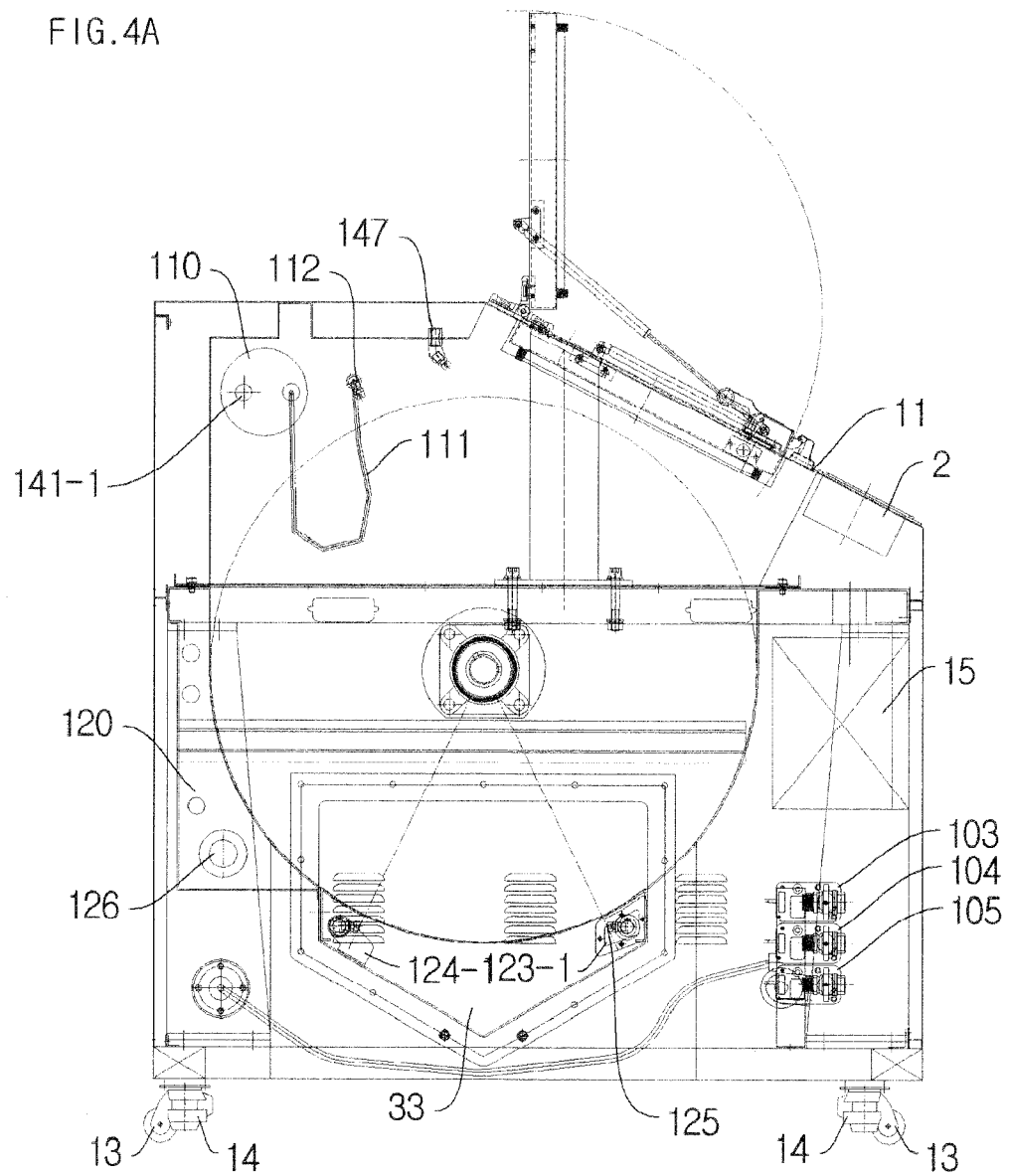
FIGS. 4A to 4B are side plan views illustrating the structure of the food waste disposal system according to the embodiment.
Figure 4B:
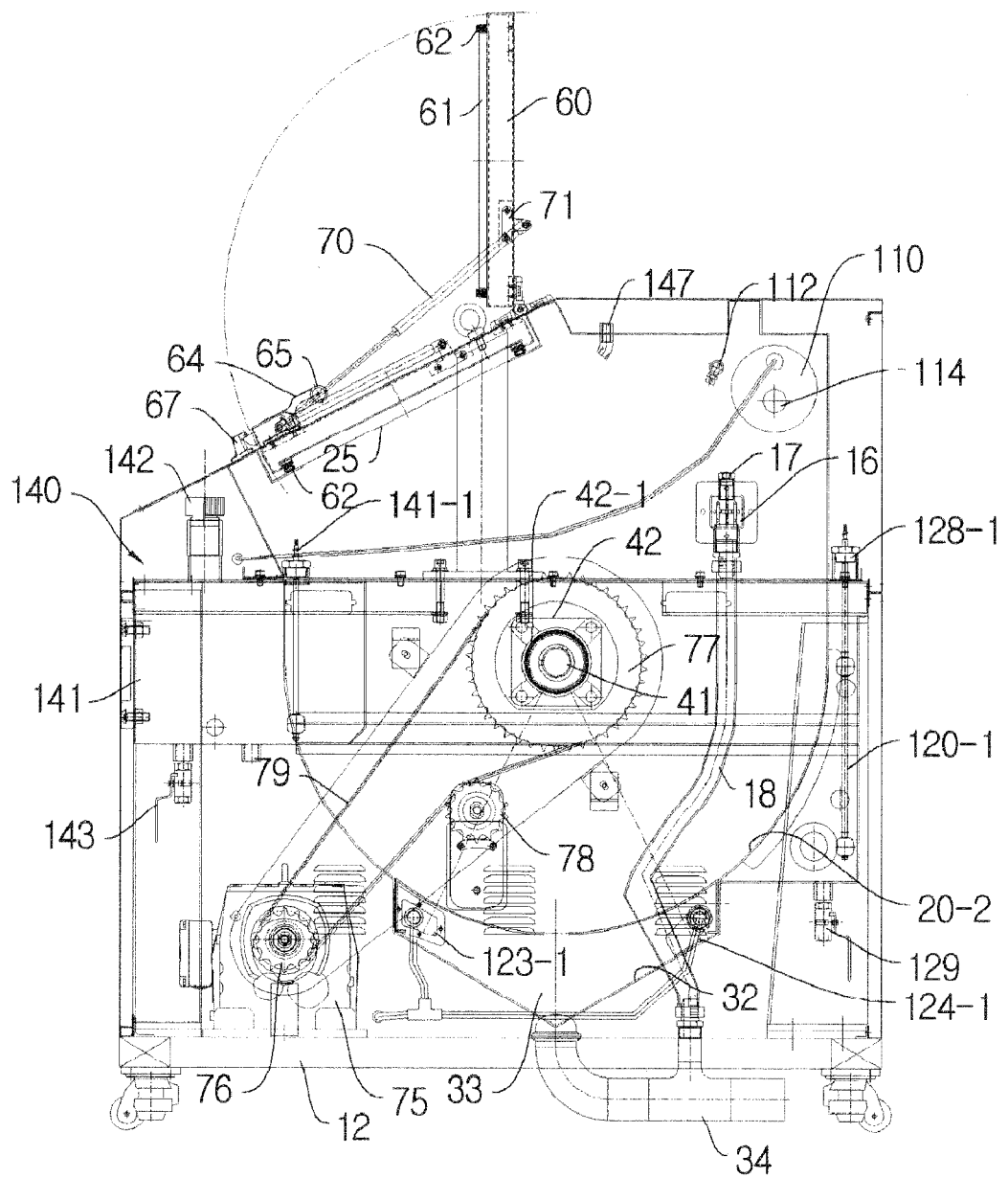
Figure 5A:
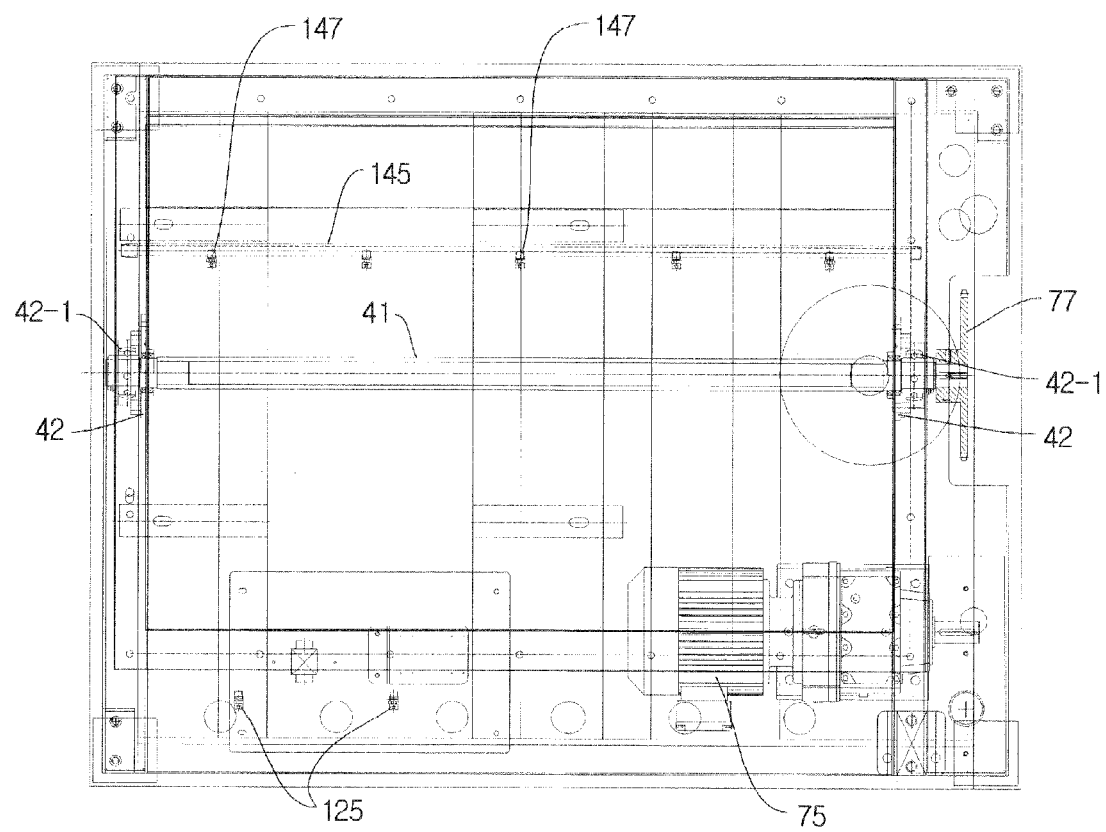
FIGS. 5A to 5B are top plan views illustrating the structure of the food waste disposal system according to the embodiment.
Figure 5B:
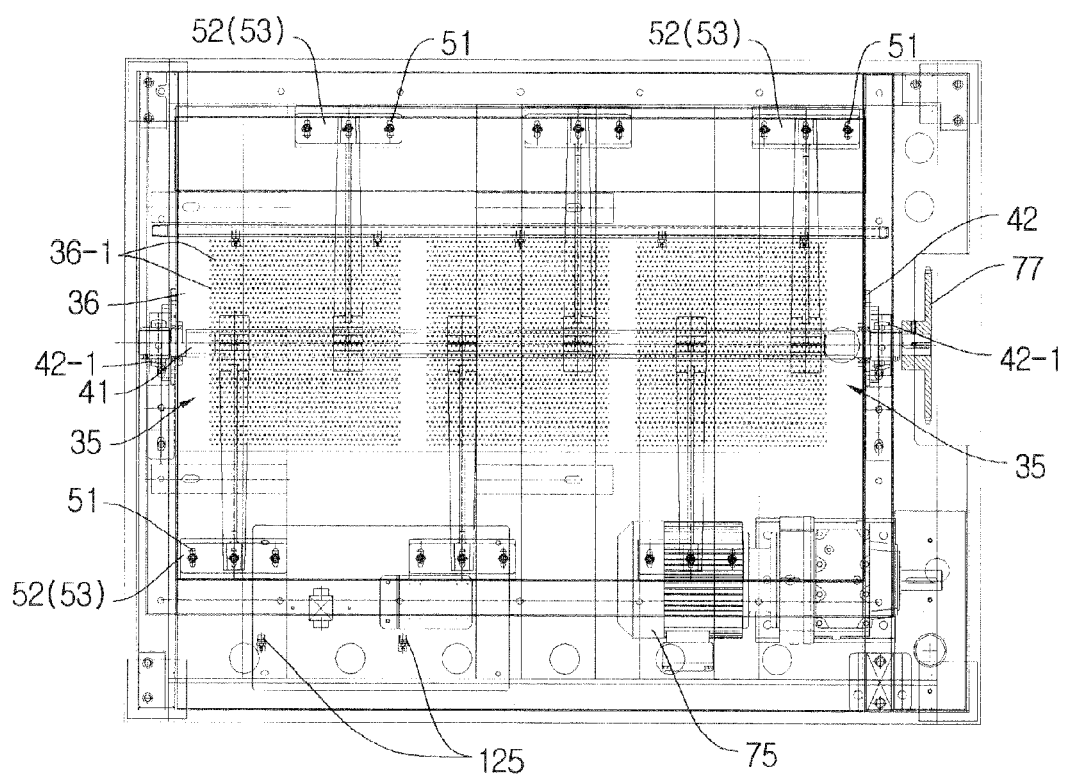
Figure 8:
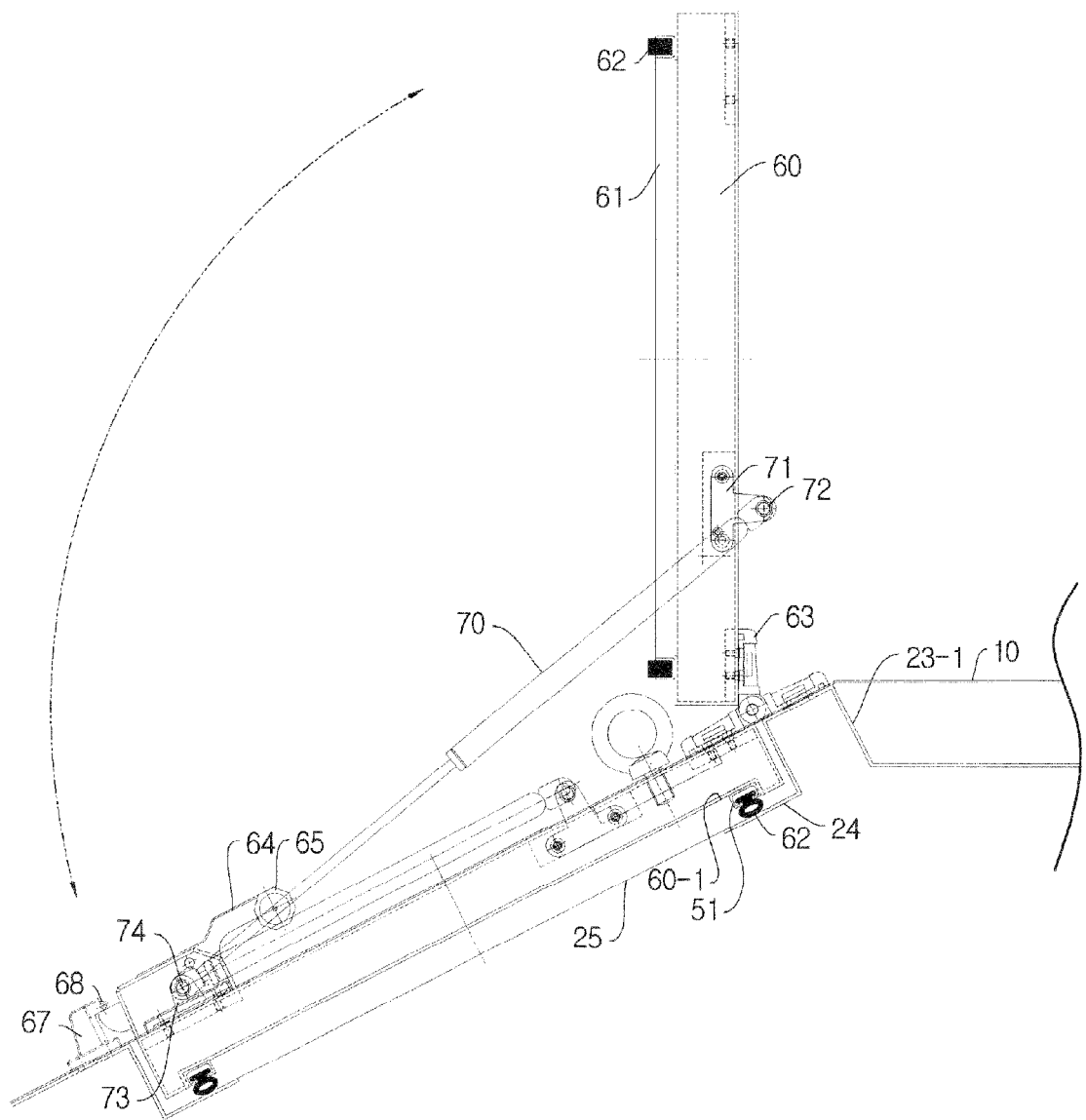
FIG. 8 is a sectional view illustrating the installation state of a door of the food waste disposal system according to the embodiment.
Figure 9B:
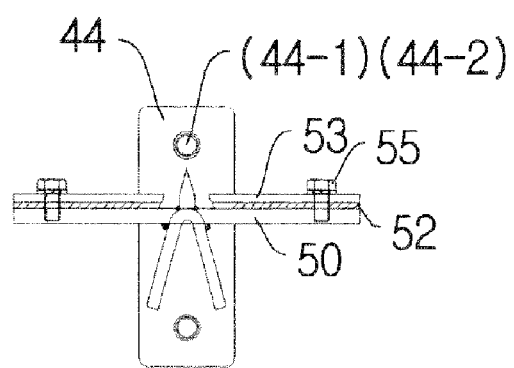
Figure 9C:
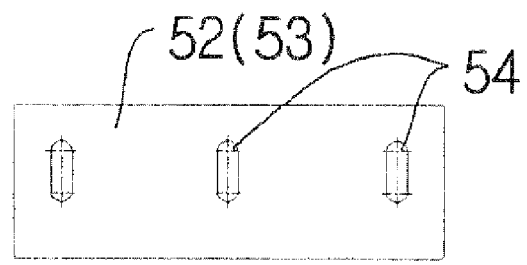
Figure 9D:
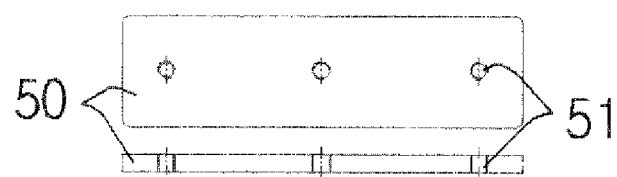
Figure 10B:
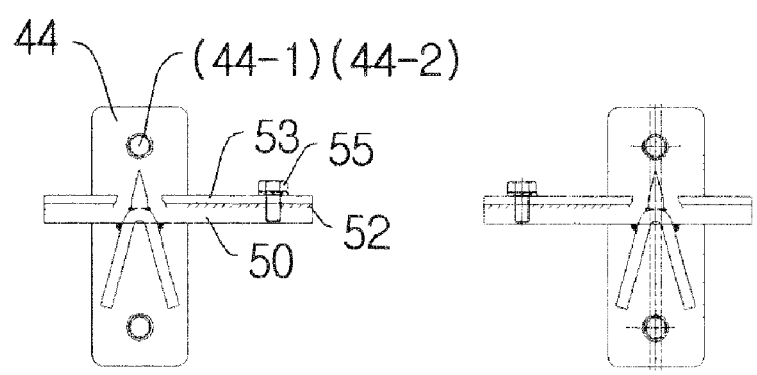
Figure 10C:
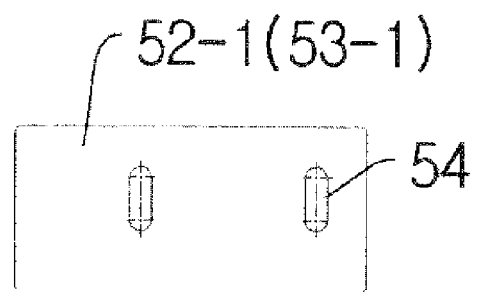
Figure 10D:
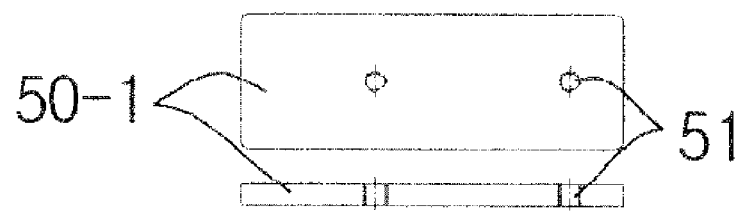

Hereinafter, a preferred embodiment of the invention will be described in detail with reference to the accompanying drawings. FIGS. 1, 2, 3A to 3C, 4A to 4B, 5A to 5B, 6A to 6C, 7A to 7B, 8, 9A to 9D and 10A to 10D show a food waste disposal system 1 according to one embodiment of the invention, in which FIG. 1 is a schematic view illustrating the food waste disposal system 1 according to one embodiment of the invention, FIG. 2 is a flow diagram illustrating an operation flow of the food waste disposal system 1, FIGS. 3A to 3C are front plan views, FIGS. 4A to 4B are side plan views, and FIGS. 5A to 5B are top plan views illustrating the structure of the food waste disposal system 1, FIGS. 6A to 6C and 7A to 7B are schematic views illustrating the structure of a prefabricated mixing basin 20 and the structure of a chamber 35, FIG. 8 is a sectional view illustrating a door 60, and FIGS. 9A to 9D and 10A to 10D are schematic views illustrating the structure of a prefabricated mixing wing 40 installed in the prefabricated mixing basin 20.

The structure of the food waste disposal system 1 according to one embodiment of the present invention will be described below.

The food waste disposal system 1 includes a rectangular parallelepiped housing 10 installed on a support frame 12. The housing 10 has an inclined upper face 11 at the front upper edge and a plurality of devices is installed inside the housing 10. Each bottom corner is provided with a caster 13 and a fixed leg 14, the height of which can be adjusted.

On the inclined upper face 11 of the housing, a door 60 is installed at the center position thereof, and a touch screen control panel 2 allowing the food waste disposal system 1 to be manipulated is installed at a lower position.

As shown in FIG. 2, the food waste disposal system 1 includes the touch screen control panel 2 installed on the inclined upper face 11 and a computer 5, which have Power Line Communication (PLC) Ethernet cards 3-1 and 3-2, respectively therein, in order to allow the waste food disposal system 1 to be controlled from a distance using the computer based on a network 4 (high-speed internet communication network).

Figure 6A:
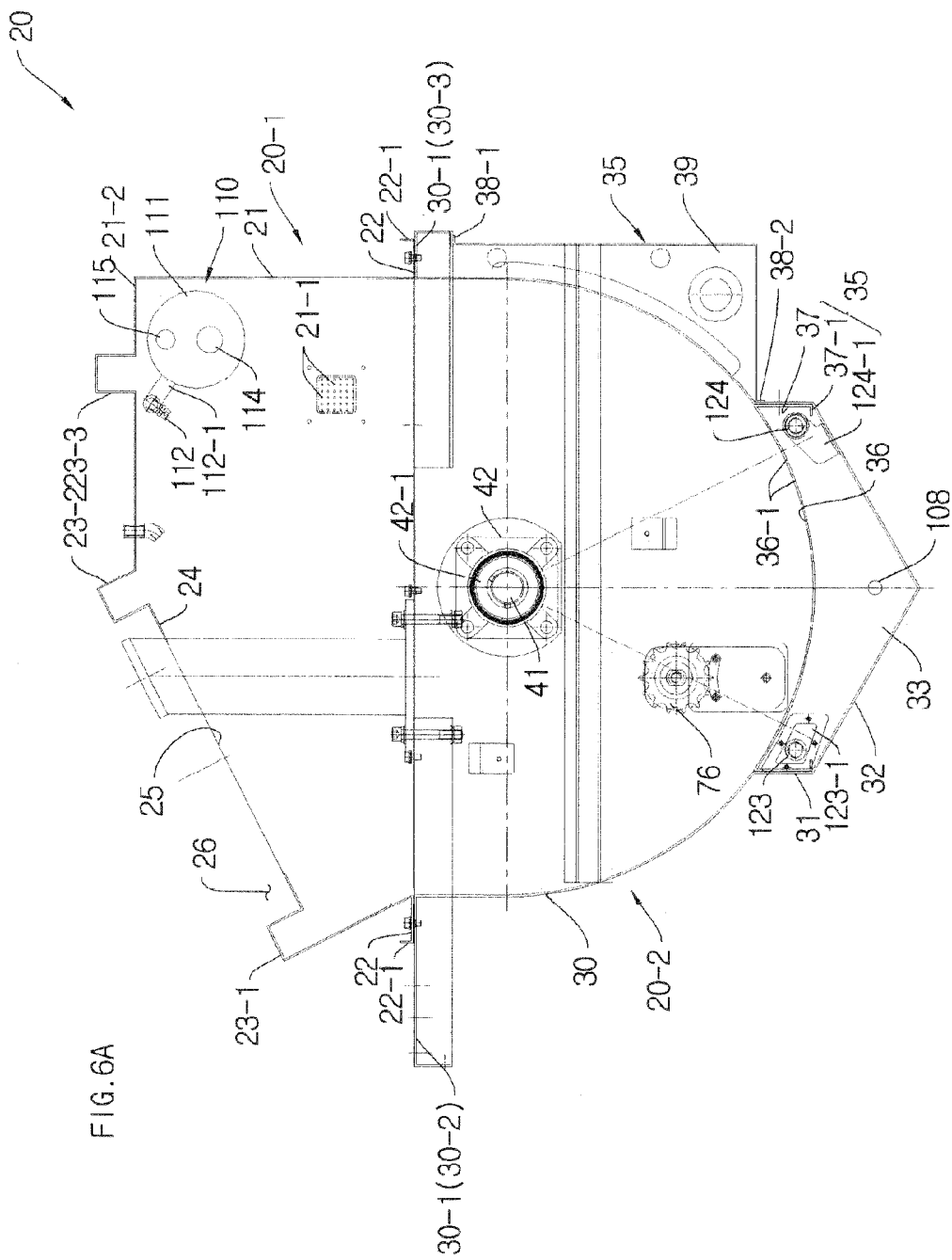
FIGS. 6A to 6C are schematic views illustrating the structure of a prefabricated mixing basin of the food waste disposal system according to the embodiment.
Figure 6B:
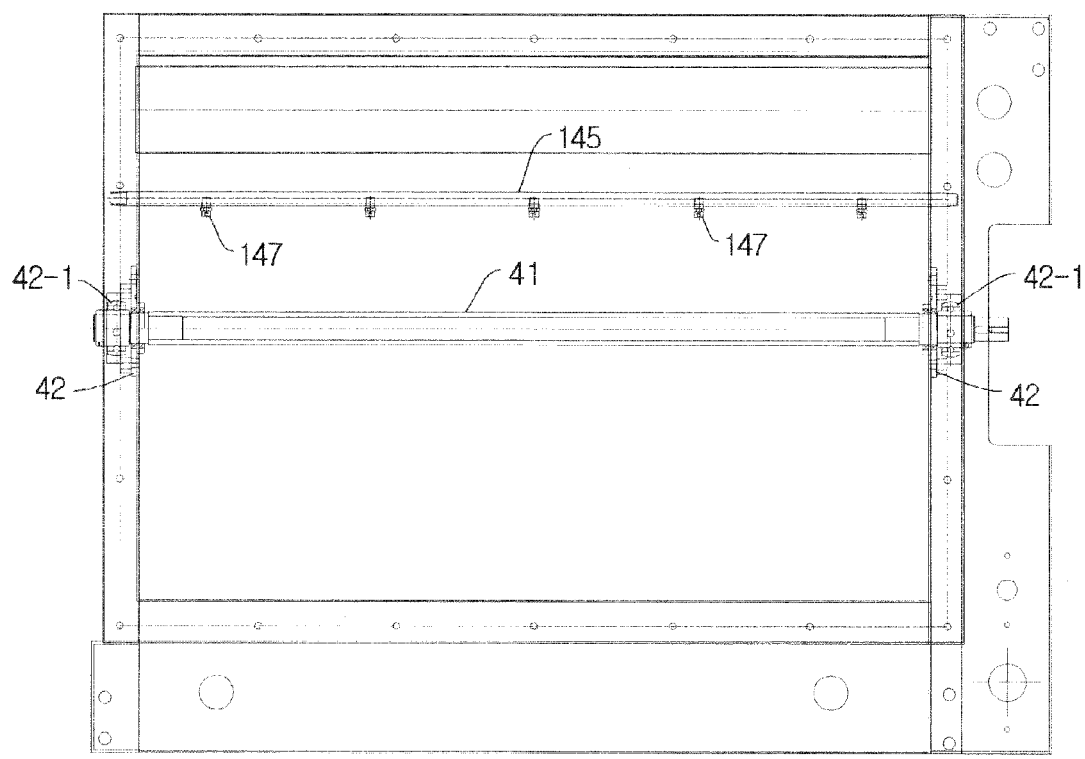
Figure 6C:
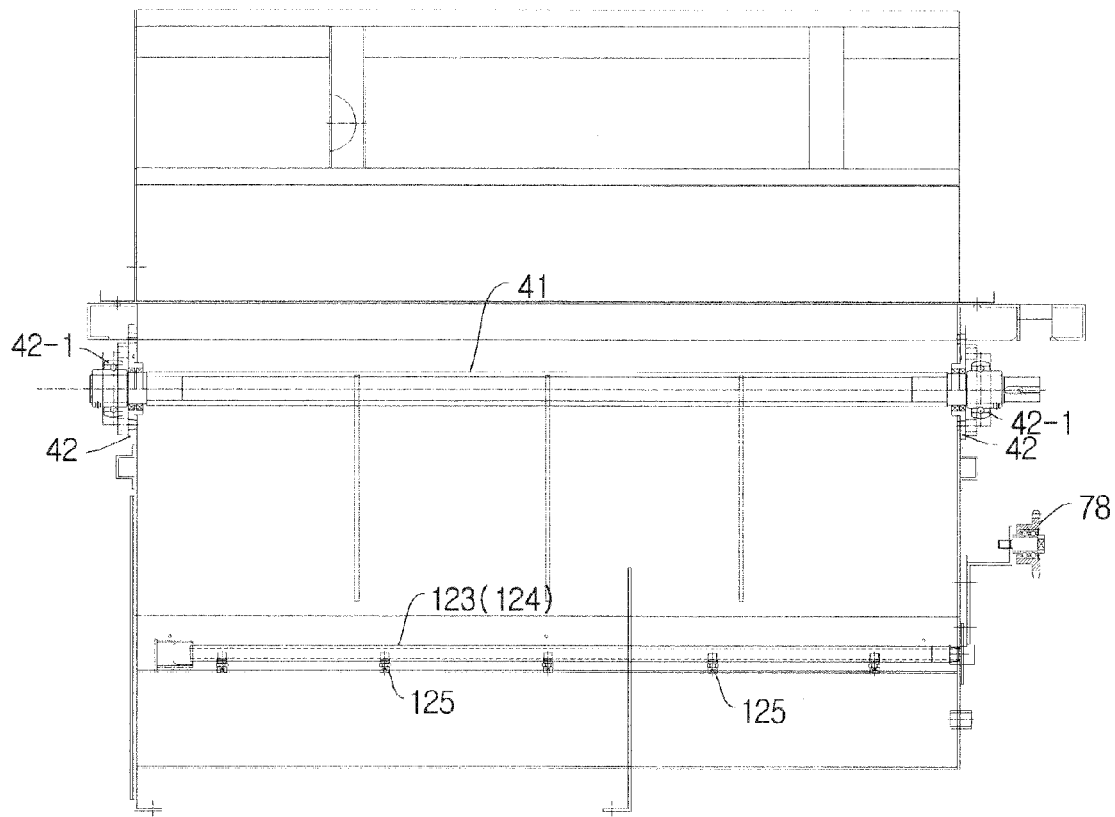
Figure 7B:
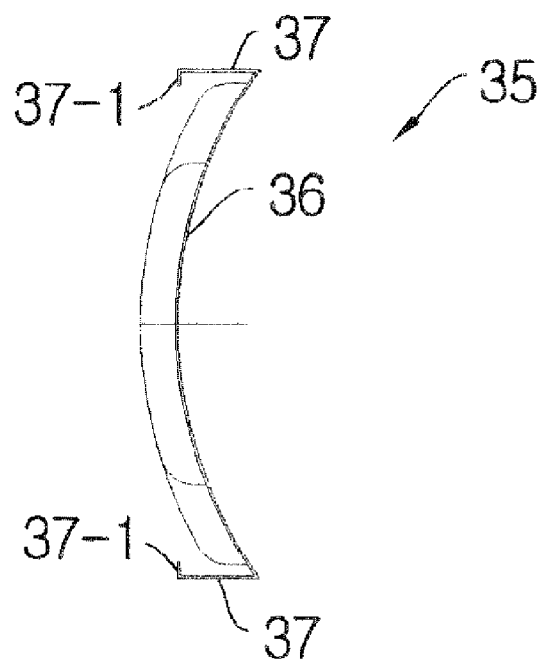

A mixing basin 20 is installed in the housing 10. As shown in FIGS. 6A to 6C, the mixing basin 20 may be constructed by assembling a plurality of separate parts, in which case the mixing basin 20 is referred to as a prefabricated mixing basin. Accordingly, it is possible to easily construct and repair the mixing basin 20.

The prefabricated mixing basin 20 is fabricated by assembling an upper basin 20-1 having an open lower end and an upper end with an inclined upper face 11 and a door 60 disposed on the inclined upper face 11 thereof, a lower basin 30 having an open upper end which is coupled to the lower end of the upper basin 20-1 by coupling means (screw bolt), in which inside the lower basin 30 is provided a rotational shaft 41, which is engaged with a plurality of prefabricated mixing wings 40 arranged at regular intervals, and a washing room 33, which is disposed at the center position of a lower end portion of the lower basin 30, a chamber 35 installed in the washing room 33, and a curved support frame 38 disposed on the back side of the lower basin 30 and providing a washing water tank receiving space 39.

A flange 22 is provided to the edge of the lower end of the upper basin 20-1 and an upward protrusion 22-1 is provided to the flange 22. The upward protrusion 22-1 enables coupling between a flange 30-1 on a lower basin side and the flange 22 on an upper basin side by coupling means (screwed bolt). The front face of the box-shaped basin 21 is an inwardly inclined face 24 which is inwardly inclined toward the upper end thereof. Support protrusions 23-1, 23-2 and 23-3 are provided on the inwardly inclined face 24 at an upper portion, a lower portion and a middle portion, by which the housing 10 is stably supported.

The lower basin 30 has a hemispherical shape and an open upper end. A flange 30-1 is provided to an edge portion of the upper end of the lower basin 30. The flange 22 on the upper basin side and the flange 30-1 on the lower basin side are coupled by coupling means (screwed bolt). The front part 30-2 of the flange 30-1 has a relatively large width and the back part 30-3 of the flange 30-1 has a relatively small width. A body 32 having an inverted triangle section is coupled at a center position thereof to the lower end of the hemispherical shape, with vertical walls 31 therebetween. A washing room 33 is provided inside the body 32 having an inverted triangle section and the vertical walls 31, and is connected to a water supply third-branch pipe 108.

The chamber 35 has a curved (concave) surface 36 and vertical support walls 37 extending downward from the edges of the curved surface 36. A plurality of water discharge holes 36-1 is formed in the curved surface 36 at regular intervals. The lower end of the vertical wall 37 is bent inward so as to form a support foot 37-1. The support foot 37-1 is disposed inside the washing room 33 and at an inward position of the vertical wall 31 under the lower basin 20-2.

An overflow hole 21-1 is formed so as to penetrate the side wall of the box-shaped basin 21. An overflow pipe 16 with a level sensor 17 is installed outside the box-shaped basin 21 and is connected to the overflow hole 21-1. The overflow pipe 16 is also connected to a drain pipe 34 disposed in the washing room 33 with an overflow discharge pipe 18 therebetween. Water overflowing through the overflow hole 21-1 is discharged through the overflow discharge pipe 18 and the drain pipe 34. When water is discharged through the overflow pipe 16, the overflowing water is detected by the level sensor 17. The supply of hot water from the built-in hot water tank 111 is stopped on the basis of the detection result from the level sensor 17.

The inclined upper face 11 provided at an upper portion of the housing 10 has a door-receiving depression 26, in which the food waste introduction opening 25 is formed, for receiving the door 60 therein, so that the door 60 does not protrude from the upper surface of the upper portion of the housing 10.

As shown in FIGS. 4A, 4B and 8, the inclined upper face 11 of the housing 10 is disposed above the middle support protrusion 23-2, and the door 60 is installed on the inclined upper face 11 in a hinged manner using a hinge 63. A sealing ring 62 is provided on the front surface of the door 60, which faces the door-receiving depression 26, so that the space inside the housing 10 is sealed when the door 60 is closed. A handle 65 is attached to a lower position of the upper surface of the door 60 using a pair of handle coupling fragments 64.

An opening and closing fragment 66 is fixed to the upper surface of the door 60 and a roller installation fragment 67 is fixed to the inclined upper face 11 of the housing 10. An opening and closing roller 68 is mounted to the roller installation fragment 67. In this manner, when the door 60 is closed and opened, the opening and closing fragment 66 is restrained by or released from the opening and closing roller 68. A pneumatic shock absorber 70 is coupled to hinge brackets 71 and 73 using hinges 72 and 74 at a location on each side surface of the door 60 and the inclined upper face 11, so that the door 60 can be easily opened and closed.

A sealing ring fixing unit 61 having an open lower end is fixed to the lower surface (front surface) of the door 60, and the sealing ring 62 is coupled to the sealing ring fixing unit 62. The sealing ring 62 is in tight contact with the inclined upper face 24 of the housing when the door 60 is closed, so that the food waste introduction opening 25 is sealed.

A built-in hot water spray device 110 with a built-in hot water tank 111 and a hot water spray nozzle 112 is installed on the back side of the upper basin 20-1 inside the housing 10.

Further, a drag material spray nozzle 147 for spraying a deodorizing and decomposing agent is installed inside the housing 10.

The built-in hot water spray device 110 installed on the back side of the upper basin 20-1 is structured as follows:

The built-in hot water tank 111 with a drain pipe 113 is installed at the upper back edge of the upper basin 20-1 and is connected to a water supply main pipe 100 provided with a main valve 101. In detail, the built-in hot water tank 111 is connected to a water supply first-branch pipe 106 provided with a first Valcon valve 103 installed in a manifold 102.

Inside the built-in hot water tank 111 is provided a temperature sensor 115 and a heater 114. Water in the built-in hot water tank 111 is heated by the heater 114 and heating is stopped when the temperature of the water is in a predetermined range (for example, 35 to 45° C.), thereby maintaining the water in the built-in hot water tank 111 at a constant temperature.

A hot water supply pipe 112-1 with a plurality of hot water spray nozzles 112 arranged at regular intervals is installed in front of the built-in hot water tank 111, and thus it is possible to intermittently or randomly spray hot water.

A deodorizing and decomposing agent spray device 140 is installed in a manner such that the drag material spay nozzle 147 is installed around the food waste introduction opening 25 so as to spray deodorizing and decomposing agent loaded in the drag material tank 141.

In detail, the deodorizing and decomposing agent spray device 140 is structured as follows. A drag material tank 141 provided with a level sensor 141-1, and a drain valve 143 is installed on the front position inside the housing 10, an end of an introduction pipe 142 connected to an upper portion of the drag tank 141 is disposed under the door (not shown) installed on the inclined upper face 11 of the housing 10, a drag material supply pipe 145 connected to a drag pump 146 is installed in a lower position of the housing 10, and an upper end of the drag supply pipe 145 is connected to the drag material spray nozzle 147 installed inside the housing 10 around the food waste introduction opening 25. Thus, drag material including deodorizing agent (perfume) and decomposing agent are sprayed from the drag material spray nozzle 147.

The washing room 33 constituting the prefabricated mixing basin 20 is provided with a water spray device for supplying water to the washing room 33, which has the drain pipe 34 installed in a lower position thereof and which has the body having the vertical wall 31 and the body 32 having an inverted triangle section, a washing room washing device 120 for washing the inside of the washing room 33 by supplying hot water, and a sterilizing device 130 for sterilizing the inside of the washing room 33. Accordingly, it is possible to wash and sterilize the inside of the washing room 33.

In the washing room 33, constituting the prefabricated mixing basin 20, the water supply device is constructed by connecting the water supply main pipe 100 with the main valve 101 to the manifold 102 and connecting the water supply third-branch 108 pipe to the third Valcon valve 105 of the manifold 102, so that the end of the water supply third-branch pipe 108 communicates with the lower end of the body 32 having an inverted triangle section.

The washing room washing device 120 for washing the inside of the washing room 33 constituting the prefabricated mixing basin 20 by spraying hot water is structured in the following manner.

The water supply main pipe 100 having the main valve 101 connected to the manifold 102, a washing water tank 120-1 is installed outside the lower basin 30 constituting the prefabricated mixing basin 20, a second Valcon valve 104 of the manifold 102 is connected to the washing water tank 120-1 via a water supply second-branch pipe 107, an overflow pipe 128 provided with a level sensor 128-1 is installed on an upper end portion of the washing water tank 120-1, and a drain valve 129 is installed on a lower end portion of the washing water tank 120-1.

In the washing water tank 120-1, a plurality of heaters, and more preferably a pair of heaters 126, is installed to face each other in a lower position thereof in order to heat water, and a temperature sensor 127-1 is installed in an upper position in order to detect the temperature of the water so as to stop the operation of the heaters 126 when the temperature of the water is in a predetermined range (for example, from 60 to 80° C.).

Washing water supply pipes 123 and 124 are installed at the front position and the back position in the washing room 33 composed of the body with a vertical wall 31 and the body 32 with an inverted triangle section using attachment fragments 123-1 and brackets 124-1. The washing water supply pipes 123 and 124 and the washing water tank 120-1 are connected via the washing water supply pipe 121 connected to the washing water supply pump 122. With such a structure, it is possible to spray the hot water in the washing water tank 120-1.

The sterilizing device 130 for sterilizing the inside of the washing room 33 includes a chemical tank 131 with an openable door which is installed inside the housing 10 but outside the prefabricated mixing basin 20, a chemical spray nozzle 134 installed in the body 32 with an inverted triangle section constituting the washing room 33, and a chemical supply pipe 132 connected between the chemical tank 131 and the chemical spray nozzle 134 and also connected to a chemical supply pump 133.

The rotational shaft 41 installed at the center portion of the hemispherical lower basin 30 is engaged with a plurality of prefabricated mixing wings 40 arranged at regular intervals in the longitudinal direction of the rotational shaft 41.

As shown in FIGS. 9A to 9D and 10A to 10D, each of the prefabricated mixing wings 40 is structured in the following manner:

There is a pair of semicircular parts 43 opposing each other, each with coupling fragments 44 at both ends thereof. Each coupling fragment 44 has a coupling hole 44-1 or a coupling nut hole 44-2. The semicircular parts 43 are coupled using coupling means such as screwed bolts passing through the coupling holes 44-1 and the coupling nut hole 44-2 of the coupling fragments 44. A V-shaped support bar 45 is fixed to the outer surface of one of the semicircular parts 43. A food waste cutting blade 46, in which a support bar 46-1 and a prism-shaped part 46-2 are integrated, is provided on the upper surface of the V-shaped bar 45. On the upper surface of a leading end portion of the V-shaped support bar 45, a mixing wing coupling fragment 50 is fixed. Further, a mixing wing 52 and a mixing wing coupling fragment 53 are stacked on and coupled to the mixing wing coupling fragment 50 using coupling means.

As shown in FIGS. 9A to 9D, each mixing wing coupling fragment 50, the mixing wing 52 and the mixing wing coupling fragment 53 of the prefabricated mixing wing 40 is provided with a plurality (for example three) of nut holes 51 and coupling holes 54 which are arranged at regular intervals so that left and right sides of the mixing wing are balanced. Alternatively, as shown in FIGS. 10A to 10D, each of the mixing wing coupling fragments 50-1, the mixing wing 52-1 and the mixing wing coupling fragment 53-1 of the prefabricated mixing wing 40 is provided with two nut holes 51 and two coupling holes 54, so that the mixing wing is biased to the left or right side.

An interlocked chain sprocket 77 is engaged with the end of the rotational shaft 41, which protrudes from the outer surface of the hemispherical lower basin 30, and a geared driving motor 75, in which a driving chain sprocket 76 is installed, is installed in front of the body 32 having an inverted triangle section. The interlocked chain sprocket 77 on the rotational shaft side and the driving chain sprocket 76 on a geared driving motor 75 are wound by a chain 79. The chain 79 is also engaged with a tension adjusting sprocket 78 installed on the side of the hemispherical lower basin 30, so that the tension of the chain 79 is adjusted by the tension adjusting sprocket 76.

The geared driving motor 75 is provided with an inverter 75-1, so that the geared driving motor 75 can rotate in a reverse direction for a predetermined time when an excessive load is applied to the prefabricated mixing wing 40, and thus food waste stuck to the mixing wing 40 is separated.

A hand cleansing and sterilizing device 15 is installed on the front side of the housing 10 in order to allow a user to wash and sterilize his or her hands after loading food waste in the mixing basin.

Hereinafter, the operation of the food waste disposal system 1 according to the above-mentioned embodiment will be described.

First, the built-in hot water spray device 110 and the washing room washing device 120 are started, thereby filling the built-in hot water tank 111 and the washing water tank 120-1 with water.

That is, by opening the first Valcon valve 103 installed in the manifold 102, water is supplied to the built-in hot water tank 111 through the water supply main pipe 100 and the water supply first-branch pipe 106.

By opening the second Valcon valve 104 installed in the manifold 102, water is supplied to the washing water tank 120-1 through the water supply main pipe 100 and the water supply second-branch pipe 107. At this time, the water supply operation is conducted in a manner such that water does not overflow to the overflow pipe 128 provided with the sensor 128-1. The water flowing to the overflow pipe 128 is discharged using a known discharging means (not shown).

Then, the chemical tank 131 of the sterilizing device is filled with chemicals, and the drag tank 141 of the deodorizing and decomposing agent spray device 140 is filled with deodorizing agent and decomposing agent through an introduction pipe 142.

In this manner, the built-in hot water tank 111 and the washing water tank 120-1 are filled with water, the chemical tank 131 is filled with chemicals, and the drag tank 141 is filled with a deodorizing agent and a decomposing agent. After that, food waste is loaded in the prefabricated mixing basin 20.

Then, the handle 65 is pulled upward in the state in which the door 60 is closed to cover the food waste introduction opening 25. At this time, the opening and closing fragment 66 is released from the roller 68, so that the door 60 is opened by pivoting on a hinge 63.

After the door 60 is opened, rods of the shock absorber coupled to both side surfaces of the door 60 extend to become longer, thereby supporting the door 60 so that it is not closed but is kept open. In this state, food waste is loaded into the mixing basin through the food waste introduction opening 25.

While the door 60 is open and food waste is being loaded into the mixing basin through the food waste introduction opening 25, the drag pump 146 of the deodorizing and decomposing agent spray device 140 is driven for a predetermined time, so that deodorizing agent and decomposing agent loaded in the drag tank 141 pass through the drag material supply pipe 145 and are sprayed from the drag material spray nozzle 147 toward the food waste introducing opening 25. The deodorizing agent and decomposing agent sprayed from the drag material spray nozzle 147 toward the food waste introduction opening 25 blocks the food waste introduction opening 25, thereby preventing food waste odors from escaping from the food waste disposal system 1, and promoting the decomposition of food waste.

When the door 60 is closed after the food waste is loaded, the opening and closing fragment 66 is restrained by the opening and closing roller 68 and the door 60 is received in the door-receiving depression 26, the lower surface of the door 60 can be in tight contact with the inclined surface 24 in the door-receiving depression 26 thanks to the sealing ring 62, and the inner space of the housing 10 is sealed.

After the food waste is loaded, a user (operator) can wash and sterilize his or her hands using the hand cleansing and sterilizing device 15 installed on the front side of the housing 10.

The food waste received in the prefabricated mixing basin 20 falls to the curved surface 36 of the chamber 35 coupled to the lower end portion of the lower basin 20-2. In this state, moisture of the food waste oozes and flows into the body 32 with an inverted triangle section through the discharge holes 36-1, i.e., into the washing room 33. Leachate collected in the washing room 33 is transferred to a Biochemical Oxygen Demand (BOD) treatment device (not shown) through the drain pipe 34.

In the case in which the moisture content of the food waste loaded in the prefabricated mixing basin 20 is very high, waste water (leachate) is discharged through the overflow pipe 16 having the level sensor 17 and the overflow discharge pipe 18, and is then transferred to the BOD treatment device (not shown).

An operator can control the operation of the food waste disposal system by directly manipulating the touch screen control panel 2 installed on the inclined upper face 11 of the housing 10. Alternatively, as shown in FIG. 2, the operation of the food waste disposal system can be controlled by manipulating the touch screen using a computer 5 from a distance in the case in which the personal computer 5 and the touch screen control panel 2-1 incorporate PLC Ethernet cards 3-1 and 3-2, respectively, therein.

The food waste disposal system can be operated in an automatic mode or in a manual mode by manipulation of the touch screen control panel 2.

When a power switch in the touch screen control panel 2 is manipulated so as to supply power to the food waste disposal system, the geared driving motor 75 starts to operate, thereby rotating the driving chain sprocket 76. When the driving chain sprocket 76 is rotated, the chain 79, the strength of which is adjusted using the tension adjusting chain sprocket 78, starts to move, and thus the interlocked chain sprocket 77 is rotated. When the interlocked chain sprocket 77 is rotated, the prefabricated mixing wings 40 move along with the rotation motion of the rotational shaft 41. The prefabricated mixing wings 40 agitate the food waste in the lower basin 30 and the chamber 35 for a predetermined period or a randomly set period.

While the prefabricated mixing wings 40 move and the food waste is agitated, the built-in hot water spray device 110 and the washing room washing device 120 also perform their functions.

That is, power is supplied to the heater 114 installed in the built-in hot water tank 111 of the built-in hot water spray device 110, and water loaded in the built-in hot water tank 111 is heated by heat from the heater 114 to a temperature of 40° C. When the water becomes hot, heat is emitted from the built-in hot water tank 111.

Further, power is also supplied to the heater 126 installed in the washing water tank 120-1 of the washing room washing device 120, so that water (washing water) in the washing water tank 120-1 is heated to a temperature of about 70° C. by heat from the heater 126. As a result, heat is emitted from the washing water tank 120-1, because the temperature of the hot water is 70° C., and is transmitted to the lower basin 30 of the prefabricated mixing basin 20, thereby heating the food waste in the lower basin 20-2.

Thanks to the heat from the built-in hot water tank 111 and the washing water tank 120-1, the space inside the prefabricated mixing basin 20 is heated and is maintained at a high temperature. As a result, the food waste is also heated, and the process of aging and drying food waste can be accelerated.

At this time, the prefabricated mixing wings 40 agitate and cut food waste into small pieces while rotating in the prefabricated mixing basin 20. Accordingly, the process of aging and drying food waste can be more easily performed. Further, because an excessive load and resistance are not applied to the geared driving motor 75, a geared driving motor 75 having relatively low performance in comparison with a geared driving motor used in known food waste disposal systems can handle a large amount of food waste, resulting in cost reduction.

In addition, if excessive load or resistance are applied to the geared driving motor 75 when an excessive amount of food waste or food waste becomes tangled around the mixing wing, and thus the geared driving motor 75 cannot smoothly rotate the mixing wings 40, the geared driving motor 75 conducts reverse rotation for a predetermined period according to a program preloaded therein.

While the geared driving motor 75 conducts reverse rotation, food waste tangled around the mixing wings is separated from the mixing wings. After that, the geared driving motor 75 resumes forward rotation to make the mixing wings agitate and cut the food waste again. That is, the geared driving motor 75 is effectively driven according to the load of the food waste, so that the food waste can be smoothly agitated.

As described above, the food waste is agitated by the prefabricated mixing wings 40, which are rotated along with the rotational shaft, and is aged by heat from the built-in hot water tank 111. Further, the drag pump 146 of the deodorizing and decomposing agent spray device 140 intermittently or randomly pumps a decomposing agent (microbes or chemicals) containing deodorizing agent at predetermined intervals for a predetermined period.

The decomposing agent (microbes or chemicals) sprayed from the drag material spray nozzle 147 is mixed with the food waste which is being agitated, thereby decomposing protein, fat, glucose, fatty acid, cellulose, or the like. At this time, ammonia and carbon dioxide are decomposed by biodegrading material, and inorganic salt or the like, containing calcium or phosphor, is decomposed by inorganic degrading material.

Leachate generated while the food waste in the prefabricated mixing basin is agitated and dried by rotation of the prefabricated mixing wings, and degraded by microbes and biodegrading and inorganic degrading materials, flows through the discharge holes 36-1 and collects in the washing room 33 having an inverted triangle section. The collected leachate is transferred to the BOD treatment device (not shown) through the drain pipe 34.

After completion of the agitating and drying food waste, residue (the dried food waste) is discharged out of the prefabricated mixing basin 20 by a discharging device (not shown) and recycled as compost.

After discharging the residue, the inside of the prefabricated mixing basin and the inside of the washing room 33 are washed and sterilized.

In detail, after discharging the residue, the hot water in the built-in hot water tank 111 of the hot water spray device 110 is sprayed from the hot water spray nozzle 112 at high pressure, thereby separating and removing the residue attached to the inner surface of the box-shaped upper basin 21 and the hemispherical lower basin 30.

The hot water ejected from the hot water spray nozzle 112 and the separated residue are introduced into the washing room 33 through the discharge holes 36-1 of the chamber 35 and are then discharged outside the food waste disposal system through the drain pipe 34. After that, the discharged hot water and residue are transferred to the BOD treatment device (not shown).

After washing the inside of the box-shaped upper basin 21 and the inside of the hemispherical lower basin 30 constituting the prefabricated mixing basin 20, the washing room 33 having the body 32 having an inverted triangle section is washed and sterilized using the washing room washing device 120 and the sterilizing device 130.

The washing of the washing room 33 using the washing room washing device 120 is performed as follows:

The hot water, loaded in the washing water tank 120-1 of the washing room washing device 120, is supplied to the washing water spray pipes 123 and 124 installed in the washing room 33 by driving the washing water supply pump 122 connected to the washing water supply pipe 121. Then, the hot water is sprayed from the spray nozzles 125 of the washing water spray pipes 123 and 124 at high pressure so as to cleanse the washing room 33 and the inside of the chamber 35 in the washing room 33. Waste water generated during while the washing room 33 and the chamber 35 is transferred to the BOD treatment device (not shown) through the drain pipe 34.

Sterilizing the washing room 33 using the sterilizing device 130 is performed as follows:

When the chemical supply pump 133 connected to the chemical supply pipe 132 is driven, chemicals (sterilizing chemical) loaded in the chemical tank 131 move along the chemical supply pipe 132 and are then sprayed from the chemical spray nozzle 134 installed in the washing room 33, so that the washing room 33 and the chamber 35 in the washing room 33 are sterilized.

After washing and sterilizing the washing room 33 and the chamber 35 in the washing room 33, the washing room 33 is filled with clean water in order to perform a food waste disposal process again When a valve (not shown) installed in the drain pipe 34 connected to the washing room 33 is closed, the third Valcon valve 105 installed in the manifold 102 is opened, so that water is distributed to the water supply third-branch pipe 108 from the water supply main pipe 100, and is then supplied to the washing room 33. When an appropriate amount of water is charged in the washing room 33, the third Valcon valve 105 is closed in order to suspend the supply of water to the washing room 33.

After the prefabricated mixing basin 20 and the washing room 33 are washed and sterilized, power supply to the food waste disposal system is suspended by manipulating a main switch (not shown). Thus, the process of decomposing food waste using the food waste disposal system according to the invention is completed. The above-mentioned process is repeatedly performed to decompose food waste.

In the food waste disposal system 1 according to the invention, the prefabricated mixing basin 20 is fabricated by assembling the box-shaped basin 21, serving as the upper mixing basin 20-1, the hemispherical lower basin 30, serving as the lower mixing basin 20-2, and the chamber 35 provided in the washing room 33. Accordingly, it is easy to construct the mixing basin and to repair the mixing basin at a low cost when part of the mixing basin is damaged.

In the food waste disposal system 1 according to the invention, the prefabricated mixing wings 40 engaged with the rotational shaft 41 are constructed by assembling the V-shaped support bar 45 with the mixing wing coupling fragment 50 at the leading end portion thereof, the mixing wing 52 and the mixing wing coupling fragment 53. Accordingly, it is easy to construct and install the mixing wing and to repair the mixing wing at low cost when part of the mixing wing becomes damaged, because only the damaged part need be replaced with a new part, instead of replacing the whole body of the mixing wing. As a result, the maintenance cost is reduced.

The food waste disposal system has the following advantageous effects. First, the food waste disposal system has a touch screen control panel installed on an upper portion of a housing thereof and a computer. Both the touch screen control panel and the computer are provided with PLC Ethernet cards respectively therein for enabling computer networking. Accordingly, the food waste disposal system can be controlled using the computer from a distance based on computer networking. Second, a mixing basin is a prefabricated basin composed of a plurality of parts, so that the mixing basin can be easily constructed and repaired. Third, a door for closing a food waste introduction opening is received in a door-receiving depression formed on an inclined upper portion of the housing when it is closed. Accordingly, the door does not protrude from the upper surface of the housing when it is closed, contributing to the good appearance of the food waste disposal system. Fourth, the food waste disposal system can easily and rapidly decompose food waste and prevent odors from escaping out of the housing when the door is open by the presence of a drag material spray nozzle which is installed around the food waste introduction opening and inside the housing, and which sprays deodorizing agent and food waste decomposing agent. Fifth, each of the mixing wings engaged with the rotational shaft is a prefabricated wing composed of parts. Accordingly, the mixing wing can be easily constructed and repaired at low cost because only a damaged part need be replaced with a new one. Sixth, the prefabricated mixing wing is provided to the upper surface of a support bar supporting a mixing wing in order to chop food waste into small pieces by forward rotation and separate the food waste from the support bar by reverse rotation when the food waste becomes stuck to or tangled around the support bar. Seventh, a built-in hot water tank is installed in the mixing basin and hot water is sprayed into the mixing basin in order to detach the food waste from the inner surface of the wall of the mixing basin. Accordingly, the inside of the mixing basin can be easily cleansed. Eighth, a washing room in which a chamber is installed is provided with a washing water spray nozzle and a chemical spray nozzle, so that the inside of the washing room is cleansed and sterilized using the washing water spray nozzle and the chemical spray nozzle. Ninth, a hand cleansing and sterilizing device is installed on the front side of the housing, so that a user (operator) can wash and sterilize his or her hands after loading food waste into the mixing basin.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A food waste disposal system, comprising:
   a housing with a food waste introduction opening;
   a door for covering the food waste introduction opening, the door having a handle disposed on an upper surface thereof and coupled to an upper portion of the housing in a hinged manner;
   a mixing basin disposed inside the housing;
   a rotational shaft axially installed on a horizontal central line of the mixing basin;
   a plurality of mixing wings engaged with the rotational shaft; and
   a geared driving motor for driving the rotational shaft,
   wherein a touch screen panel installed on an upper surface of the housing and a personal computer incorporate power line communication (PLC) network cards therein so as to allow the food waste disposal system to be controlled from a distance using the computer, which is networked,
   wherein the mixing basin installed in the housing is provided as a prefabricated mixing basin constructed assembling a plurality of parts so that the mixing basin can be easily constructed and repaired;
   wherein the housing has a door receiving depression in an inclined face provided at an upper end portion of the housing, in which the food waste introduction opening is provided within the door receiving depression and the door with the handle disposed at a lower position of an upper surface of the door is received in the door receiving depression,
   wherein a deodorizing and decomposing agent spray device having a drag material spray nozzle installed in the housing around the food waste introduction opening is installed in order to spray a deodorizing and decomposing agent from a drag material tank;
   wherein the mixing wings, engaged with the rotational shaft at regular intervals, are prefabricated mixing wings;
   wherein a built-in hot water spray device is installed in the mixing basin and includes a hot water tank with a heater installed in the hot water tank, so as to spray hot water;
   wherein the geared driving motor is connected to an inverter in order to conduct reverse rotation for a predetermined period when a load higher than a predetermined load is applied to the geared driving motor so as to rotate the wings in a reverse direction; and
   wherein a hand cleansing and sterilizing device is installed in front of the housing to allow a user to wash and sterilize his or her hands, wherein the mixing basin is constructed by assembling a plurality of parts and installed in the housing, the parts comprising:
   a box-shaped basin having an open lower end to be coupled to a lower basin using coupling means and having an inclined upper surface provided with the door;
   a lower basin, which has an open upper end to be coupled to the lower end of the box-shaped basin using the coupling means, which is provided with the rotational shaft engaged with the mixing wings at regular intervals, and which has a washing room at a lower center portion thereof;

a chamber disposed in the washing room of the lower basin; and a curved support frame serving as a washing water tank receiving space and installed outside and on a back side of the lower basin.

2. The food waste disposal system according to claim 1, wherein the box-shaped basin constituting the mixing basin is structured in the following manner;

the lower end of the box-shaped basin is open and provided with a flange which has an upward protrusion on an edge portion thereof, and a front face thereof is an inwardly inclined face, in which an upper edge of the front face is provided with an inclined face and the inclined face is provided thereon with respective protrusion supports at a lower position, a middle position and an upper position thereof.

3. The food waste disposal system according to claim 1, wherein the lower basin constituting the mixing basin is constructed in the following manner:

the lower basin has a hemispherical shape;

the upper end of the lower basin is open and provided with a flange; and a body having an inverted triangle section is provided at a lower center position of the hemispherical lower basin and is integrated with the hemispherical lower basin with vertical walls interposed therebetween, so as to provide the washing room inside it.

4. The food waste disposal system according to claim 1, wherein the chamber disposed in the lower basin constituting the mixing basin comprises:

a curved surface in which a plurality of water discharge holes is formed;

vertical support walls installed in a manner of bending from edges of the curved surface; and support feet provided by inwardly bending lower ends of the vertical support walls.

5. The food waste disposal system according to claim 1, wherein the door is installed in the following manner:

the door is coupled to the inclined face of the housing, which is disposed on a support protrusion provided on an upper surface of a box-shaped basin, which is part of the mixing basin, in a hinged manner, and is installed so as to face the door receiving depression;

an opening and closing fragment is fixed to a front face of the door, a roller installation fragment is fixed to the inclined face of the housing, and a roller is axially installed on the roller installation fragment;

shock absorbers installed between a side surface of the door and an upper surface of the inclined face of the housing; and a sealing ring fixing unit having a rectangular shape and an open lower end is fixed to a lower surface of the door and a sealing ring is attached to the sealing ring fixing unit.

6. The food waste disposal system according to claim 5, wherein the lower surface of the door, installed so as to be received in the door receiving depression, has a recess, and the sealing ring fixing unit, having a rectangular shape, is provided in the recess.

7. The food waste disposal system according to claim 1, wherein the built-in hot water spray device on a back side of a box-shaped basin includes:

a built-in hot water tank having a drain pipe and disposed inside the box-shaped basin in an upper back edge portion of the box-shaped basin, wherein the built-in hot water tank is connected to a water supply main pipe with a main valve via a water supply first-branch pipe with a first valve;

a heater installed inside the built-in hot water tank for heating water in the built-in hot water tank;

a temperature sensor for detecting temperature of the water in the built-in hot water tank and stopping operation of the heater when the temperature of the water reaches a predetermined temperature; and a hot water supply pipe with a plurality of hot water spray nozzles arranged at regular intervals, which is installed in front of the built-in hot water tank at regular intervals.

8. The food waste disposal system according to claim 1, wherein the deodorizing and decomposing agent spray device for spraying a deodorizing and decomposing agent from drag material spray nozzles installed inside the housing around the food waste introduction opening includes a drag tank installed in a front position in the housing and having an introduction pipe, a level sensor and a drain valve, and wherein a drag supply pipe coupled to a drag pump is connected to a lower position of the housing and a leading end of the drag supply pipe is connected to the drag material spray nozzle installed in the housing around the food waste introduction opening.

9. The food waste disposal system according to claim 1, wherein inside the washing room constituting the mixing basin is provided a water supply device for supplying water, a washing room washing device for washing the inside of the washing room by spraying hot water, and a sterilizing device for sterilizing an inside of the washing room.

10. The food waste disposal system according to claim 9, wherein the water supply device for supplying water to the washing room constituting the mixing basin is structured in a manner such that a water supply main pipe provided with a main valve is connected to a manifold, a water supply third-branch pipe is connected to a third valve of the manifold, and an end portion of the water supply third-branch pipe communicates with a lower end portion of a body with an inverted triangle section.

11. The food waste disposal system according to claim 9, wherein the washing room washing device for washing the inside of the washing room constituting the mixing basin is structured in a manner such that a water supply main pipe provided with a main valve is connected to a manifold, a washing water tank provided with an overflow pipe and a drain valve is installed outside the lower basin constituting the mixing basin, and a second valve of the manifold and the washing water tank communicate with a water supply second-branch pipe;

wherein the washing room washing device includes a plurality of heaters installed in the washing water tank for heating water in the washing water tank, a temperature sensor for detecting temperature of the water in the washing water tank and stopping operation of the heaters when the detected temperature reaches a predetermined temperature, a pair of washing water supply pipes disposed inside the washing room composed of vertical walls and a body having the inverted triangle section; and wherein the washing water supply pipes and the washing water tank are connected so as to communicate with another washing water supply pipe provided with a washing water supply pump.

12. The food waste disposal system according to claim 9, wherein the sterilizing device for sterilizing the inside of the washing room includes:

a chemical tank disposed inside the housing but outside the mixing basin and having an opening which can be closed and opened, and a chemical spray nozzle installed inside a body with an inverted triangle section constituting the washing room; and wherein the chemical tank and the chemical spray nozzle are connected to a chemical supply pipe connected to a chemical supply pump.

13. The food waste disposal system according to claim 1, wherein each of the mixing wings installed to a rotational shaft of a hemispherical lower basin constituting the housing includes:
- a pair of semicircular parts, each having respective coupling fragments at ends thereof, in which the pair of semicircular parts is arranged to face each other, the coupling fragments are provided with a coupling hole and a coupling nut hole, and the semicircular parts are coupled to each other by coupling means;
- a V-shaped support bar coupled to a outer surface of either of the semicircular parts;
- a food waste cutting blade joined to an upper surface of the V-shaped support bar;
- a first mixing wing coupling fragment provided on an upper surface of a leading end portion of the V-shaped support bar; and
- a mixing wing and a second mixing wing coupling fragment installed and coupled to a upper surface of the first mixing wing coupling fragment using a bolt.

14. The food waste disposal system according to claim 13, wherein the food waste cutting blade coupled to the upper surface of the V-shaped support bar comprises a support part and a prism-shaped body which are integrated into a single body.

15. The food waste disposal system according to claim 14, wherein the first mixing wing coupling fragment, the mixing wing and a second mixing wing fragment installed to the upper surface of the V-shaped support bar are provided as a first unbalanced mixing wing coupling fragment, an unbalanced mixing wing, and a second unbalanced mixing wing coupling fragment, respectively, so that the mixing wing is biased to either a left or a right side.

16. The food waste disposal system according to claim 1, further comprising an overflow hole formed to penetrate through a side of a box-shaped basin, and an overflow pipe installed outside the box-shaped basin and provided with a level sensor, wherein the overflow pipe is connected to a drain pipe provided inside a washing room via an overflow discharge pipe.

17. The food waste disposal system according to claim 7, wherein temperature of the water heated by the heater in the built-in hot water spray device is in a range from 35 to 45° C.

18. The food waste disposal system according to claim 11, wherein temperature of the water heated by a heater in the washing room washing device and loaded in the washing water tank is in a range from 60 to 80° C.

19. The food waste disposal system according to claim 2, wherein inside the washing room constituting the mixing basin is provided a water supply device for supplying water, a washing room washing device for washing the inside of the washing room by spraying hot water, and a sterilizing device for sterilizing an inside of the washing room.

20. The food waste disposal system according to claim 3, wherein inside the washing room constituting the mixing basin is provided a water supply device for supplying water, a washing room washing device for washing the inside of the washing room by spraying hot water, and a sterilizing device for sterilizing an inside of the washing room.

* * * * *